United States Patent
Lim et al.

(10) Patent No.: US 10,819,494 B2
(45) Date of Patent: Oct. 27, 2020

(54) METHOD FOR RECEIVING AND TRANSMITTING DATA IN FULL DUPLEX SYSTEM

(71) Applicant: Samsung Electronics Co., Ltd., Suwon-si, Gyeonggi-do (KR)

(72) Inventors: Jongbu Lim, Seoul (KR); Jiyun Seol, Seongnam-si (KR); Byunghwan Lee, Yongin-si (KR); Kwanghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 15/542,389

(22) PCT Filed: Jan. 7, 2016

(86) PCT No.: PCT/KR2016/000136
§ 371 (c)(1),
(2) Date: Oct. 31, 2017

(87) PCT Pub. No.: WO2016/111559
PCT Pub. Date: Jul. 14, 2016

(65) Prior Publication Data
US 2018/0048455 A1    Feb. 15, 2018

(30) Foreign Application Priority Data

Jan. 7, 2015 (KR) .................. 10-2015-0001923

(51) Int. Cl.
*H04L 5/14* (2006.01)
*H04L 1/18* (2006.01)
(Continued)

(52) U.S. Cl.
CPC ............ *H04L 5/14* (2013.01); *H04B 17/318* (2015.01); *H04B 17/345* (2015.01); *H04L 1/18* (2013.01);
(Continued)

(58) Field of Classification Search
CPC combination set(s) only.
See application file for complete search history.

(56) References Cited

U.S. PATENT DOCUMENTS

| 2010/0329131 A1 | 12/2010 | Oyman et al. |
| 2012/0082040 A1* | 4/2012 | Gong ............... H04W 74/0816 370/252 |

(Continued)

FOREIGN PATENT DOCUMENTS

| KR | 1020090132829 A | 12/2009 |
| KR | 1020130069018 A1 | 6/2013 |

OTHER PUBLICATIONS

Korean Intellectual Property Office, International Search Report, Application No. PCT/KR2016/000136, dated Apr. 18, 2016, 5 pages, publisher KIPO, Daejeon, Korea.

*Primary Examiner* — Hassan A Phillips
*Assistant Examiner* — Gautam Sharma

(57) ABSTRACT

The present disclosure relates to a 5G or pre-5G communication system to be provided for supporting a higher data transmission rate after a 4G communication system such as LTE. A method for receiving a packet by a second receiver in a network for supporting full duplex communication between three or more different nodes on the basis of a destination, according to an embodiment of the present invention, may comprise the steps of overhearing a request-to-send (RTS) signal transmitted by a first transmitter to a first receiver; generating information on the strength of an interference signal between the first transmitter and a node using information on the reception strength of the overheard (Continued)

RTS signal; reporting, to a second transmitter, the generated information on the strength of the interference signal between nodes; and when packet data is received from the second transmitter, demodulating and decoding the packet data, and transmitting a response signal.

20 Claims, 18 Drawing Sheets

(51) Int. Cl.
     *H04B 17/318*     (2015.01)
     *H04L 5/00*     (2006.01)
     *H04B 17/345*     (2015.01)
     *H04W 74/08*     (2009.01)

(52) U.S. Cl.
     CPC ....... *H04L 5/0055* (2013.01); *H04W 74/0816* (2013.01); *H04L 1/1854* (2013.01)

(56) References Cited

U.S. PATENT DOCUMENTS

| | | | |
|---|---|---|---|
| 2012/0099450 A1* | 4/2012 | Madan | H04W 74/0816 370/252 |
| 2012/0201173 A1 | 8/2012 | Jain et al. | |
| 2013/0083684 A1* | 4/2013 | Yeh | H04W 8/26 370/252 |
| 2013/0136013 A1* | 5/2013 | Kneckt | H04W 74/0816 370/252 |
| 2013/0156191 A1 | 6/2013 | Lim et al. | |
| 2013/0208607 A1* | 8/2013 | Abraham | H04W 74/0816 370/252 |
| 2013/0281143 A1* | 10/2013 | Nentwig | H04W 72/1231 455/501 |
| 2014/0071865 A1 | 3/2014 | Aggarwal et al. | |
| 2014/0169233 A1 | 6/2014 | Aggarwal et al. | |
| 2018/0048455 A1* | 2/2018 | Lim | H04L 5/0055 |

* cited by examiner

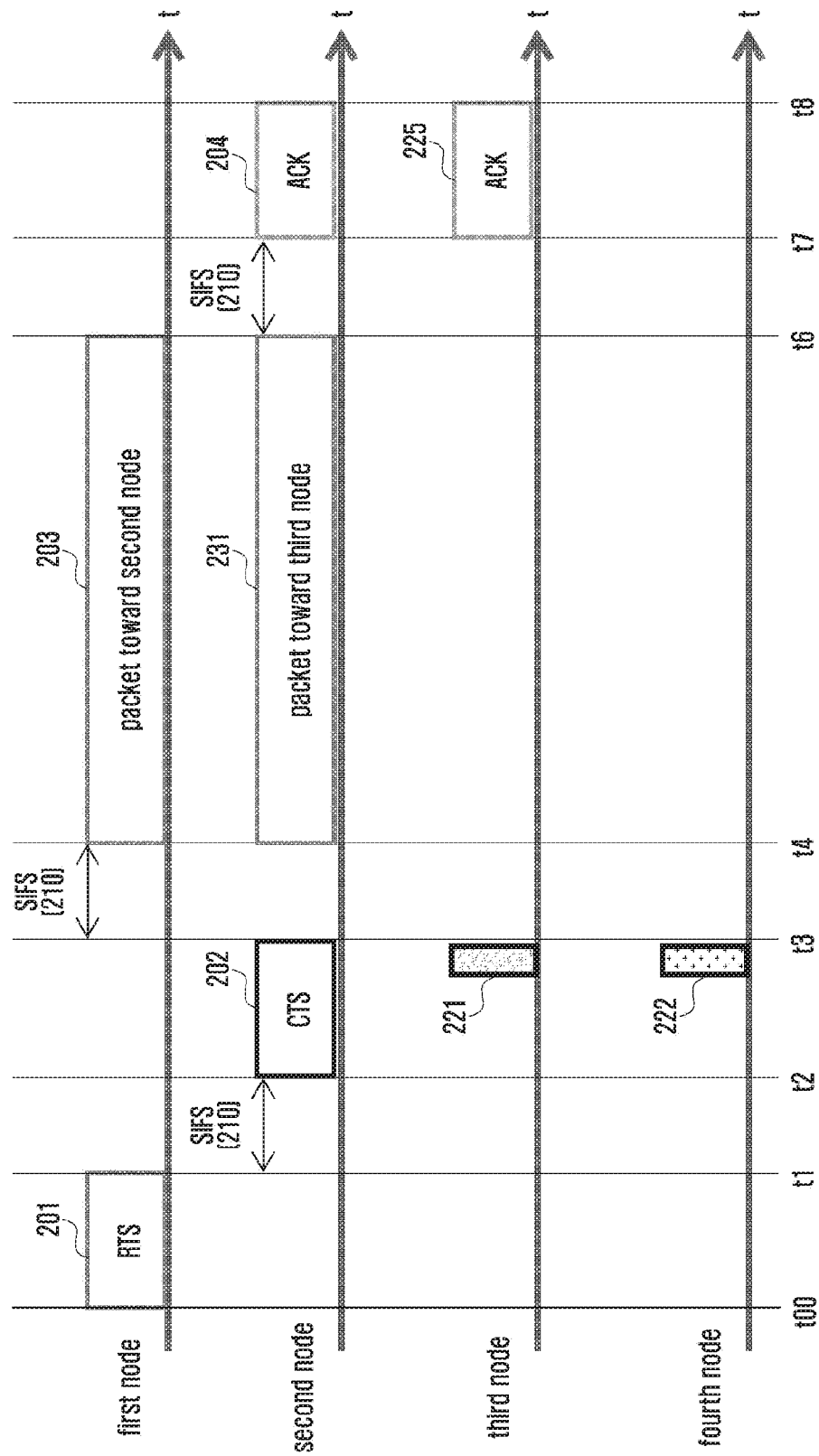

METHOD FOR RECEIVING AND TRANSMITTING DATA IN FULL DUPLEX SYSTEM

CROSS-REFERENCE TO RELATED APPLICATION(S) AND CLAIM OF PRIORITY

The present application claims priority under 35 U.S.C. § 365 to International Patent Application No. PCT/KR2016/000136 filed Jan. 7, 2016, entitled "METHOD AND RECEIVING AND TRANSMITTING DATA IN FULL DUPLEX SYSTEM", and, through International Patent Application No. PCT/KR2016/000136, to Korean Patent Application No. 10-2015-0001923 filed Jan. 7, 2015, each of which are incorporated herein by reference into the present disclosure as if fully set forth herein.

TECHNICAL FIELD

The present invention relates to a data transmission/reception method in a radio communication system allowing a node to transmit and receive signals simultaneously.

BACKGROUND

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system.

Consideration, is being given to implementing live 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive Multiple-input. Multiple Output (MIMO). Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (cloud RAN), ultra-dense network, Device to Device (D2D) communication, wireless backhaul, moving network, cooperative communication. Coordinated Multi-Points (CoMP), and interference cancellation.

Furthermore, the ongoing research includes the use of Hybrid Frequency Shift Keying (FSK) and Quadrature Amplitude Modulation (QAM). Frequency QAM (FQAM), and Sliding Window Superposition Coding (SWSC) as Advanced Coding Modulation (ACM). Filter Bank Multi Carrier (FBMC), Non-Orthogonal Multiple Access (NOMA), and Sparse Code Multiple Access (SCMA).

Typically, a radio communication system operates in one of two duplex modes, which are categorized based on how the given frequency is used and/or time resources; half-duplex and full duplex. The half-duplex mode is characterized in that a node can transmit or receive a signal at any one time. In the case where two nodes are communicating in the half-duplex mode, one node can receive but not transmit signals while the other transmits the signals but cannot receive any signal. That is, one node can transmit or receive a signal at any one time.

The full-duplex mode is characterized in that a node can transmit and receive signals simultaneously. In the case where two nodes are communicating in the full-duplex mode, one node can transit a signal to the other and receive the signal transmitted by the other simultaneously.

Recently, there have been proposals for applying the full-duplex (FD) mode to a Wi-Fi system. In the Wi-Fi system, two scenarios of FD mode can be considered.

One of them is called pair-wise FD mode or bi-directional transmission. This scenario is gainful in comparison with the half-duplex mode only when bi-directional traffic exists. Also, this scenario is advantageous in terms of backward compatibility with the legacy systems.

The other scenario is called unrestricted FD mode or three-node transmission. This scenario is operable when a scheduling opportunity is provided and only the Access Point (AP) is capable of transmitting and receiving signals simultaneously.

Meanwhile, a Media Access Control (MAC) layer protocol for the full-duplex mode has been proposed for the first scenario. A description is made of the MAC layer protocol proposed for the first scenario hereinafter.

In the first scenario, the requirement of positive Acknowledgement (ACK) is modified such that transmitting ACK has a priority higher than that of receiving ACK. This makes it possible to transmit and receive the ACK information, in the first scenario, and to improve fairness by modifying requirements for overhearing behavior specified in the current standard and to facilitate implementing pair-wise FD by allowing the start of secondary transmission after exchange of a Request-To-Send (RTS) and a Clear-To-Send (CTS).

Meanwhile, in order to support the second scenario, a new MAC layer protocol has been proposed without consideration of the legacy protocol.

Accordingly, the technique for the pair-wise FD is gainful in comparison with, the half-duplex mode only when bi-directional traffic exists and applicable when both the nodes support the FD function. Meanwhile, the technique proposed to support the second scenario cannot be applied to the current Wi-Fi systems because it does not guarantee backward compatibility with the conventional technologies.

SUMMARY

The present invention provides a MAC protocol for guaranteeing backward compatibility with the conventional technologies in an unrestricted full-duplex system.

Also, the present invention provides a data transmission/reception apparatus and method, for cancelling interference between two nodes in an unrestricted full-duplex system.

Also, the present invention provides a data transmission/reception apparatus and method that is capable of achieving transmission efficiency gain of the full-duplex mode.

In accordance with an aspect of the present invention, a packet reception method of a secondary receiver in a network supporting destination-based full-duplex communication among three or more nodes includes overhearing a Request-To-Send (RTS) signal transmitted from a primary transmitter to a primary receiver, generating an inter-node interference strength information in association with the primary transmitter based on received signal strength of the overheard RTS signal, reporting the inter-node, interference strength information to a secondary transmitter, demodulating and decoding, when packet data are received from the secondary transmitter, the packet data, and transmitting an acknowledgement signal in response to the packet data.

In accordance with another aspect of the present invention, a packet transmission and reception method of a node operating as a primary receiver and a secondary transmitter in a network supporting destination-based full-duplex communication among three or more nodes includes transmitting, when a Request-To-Send (RTS) signal is received from a primary transmitter, a Clear-To-Send (CTS) signal, after a predetermined time period elapses, receiving inter-node interference strength information from candidate secondary transmitters using at least part of resources allocated for transmitting the CTS signal, determining the secondary receiver based on the inter-node interference strength information, and transmitting, when a packet is received from the primary transmitter, a packet to the secondary receiver using the same resource.

In accordance with another aspect of the present invention, a packet transmission method of a candidate secondary transmitter in a network supporting source-based full-duplex communication among three or more nodes includes overhearing a Request-To-Send (RTS) signal transmitted from a primary transmitter to a primary receiver and a Clear-To-Send (CTS) signal transmitted from the primary receiver to the primary transmitter, estimating interference signal strength of a secondary receiver based on the CTS signal, and transmitting, when the estimated interference signal strength fulfils a transmission condition, a packet to the secondary receiver idler a random back-off time elapses.

In accordance with another aspect of the present invention, a packet transmission and reception method of a node operating as a primary transmitter and a secondary receiver in a network supporting source-based full-duplex communication among three or more nodes includes transmitting a Request-To-Send (RTS) signal to a primary receiver, receiving a Clear-To-Send (CTS) signal from the primary receiver in response to the RTS signal, transmitting a packet to the primary receiver using predetermined resources, receiving a packet from a secondary transmitter using the same predetermined resources, receiving, when the packet is completely transmitted to the primary receiver, an acknowledgement signal from the primary receiver, and transmitting an acknowledgement signal in response to the packet received, from the secondary transmitter.

The unrestricted full-duplex system of the present invention is advantageous in terms of guaranteeing backward compatibility with conventional technologies and cancelling interference between nodes. Also, the present invention is advantageous in terms of achieving transmission efficiency gain of the full-duplex mode. Also, the present invention is advantageous in terms of acquiring interference information without extra resource allocation. Also, the present invention is advantageous in terms of being applicable to both the ad-hoc and infrastructure mode systems.

BRIEF DESCRIPTION OF THE DRAWINGS

FIGS. 2A and 2B are timing diagrams illustrating packet transmission and inter-node interference strength measurement and report operations among the nodes in a destination-based FD mode according to an embodiment, of the present invention;

DETAILED DESCRIPTION

Figure 1:
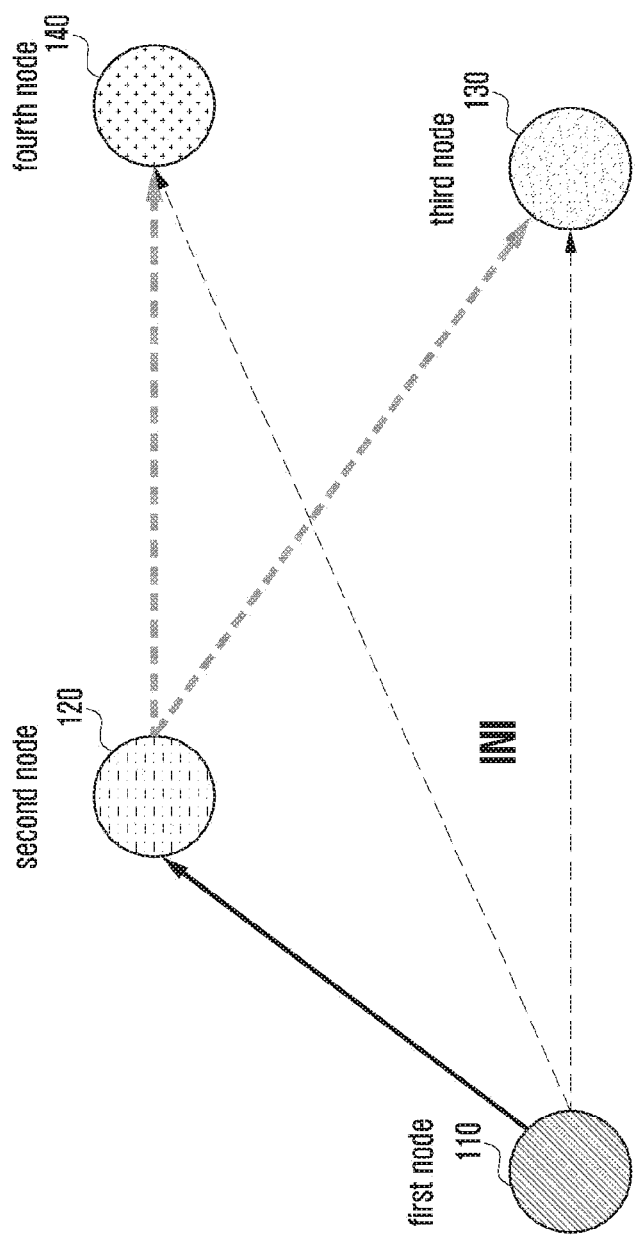
FIG. 1 is a diagram illustrating a system model operating in a destination-based three-node FD mode.

Exemplary embodiments of the present invention are described in detail with reference to the accompanying drawings. The same reference numbers are used throughout the drawings to refer to the same or like parts. It is noted, that the accompanying drawings are provided to help understand the present invention, but they not intended to limit the invention thereto. Detailed descriptions of well-known functions and structures incorporated herein may be omitted to avoid obscuring the subject matter of the present invention. It should be noted that the following description is made only of the pans necessary to help understand the operations according to various embodiments of the present invention and is not made of other parts to avoid, obscuring the subject matter of the present invention.

A description is made hereinafter of the MAC protocol to be applied to an unrestricted full-duplex (FD) system to solve the above problems.

Unlike the pair-wise FD system, the unrestricted FD system may incur inter-node interference. Accordingly, the present invention also proposes a method for cancelling inter-node interference In order to cancel the inter-node interference, it may be necessary to estimate an inter-node interference component and to feed back the estimation result. A description is made of the apparatus and method for scheduling based on the estimated interference information.

In an embodiment of the present invention, it is assumed that three nodes are communicating. Communication links may be established among the three nodes in two ways.

Descriptions are made of the respective links hereinafter. A first link may be established between a first node as a primary transmitter and a second node as 4 primary receiver for communication therebetween. Also, a second link may be established between, the second node as a secondary transmitter and a third node as a secondary receiver for communication therebetween.

Here, the final node may be a destination or a source. If the final node is the destination, this may be referred to as "destination-based three-node FD"; if the final node is the source, this may be referred to as "source-based three-node FD".

In the case that the three nodes are operating in the destination-based FD mode, the first node acts as the primary transmitter, the second node acts as the primary receiver and the secondary transmitter, and the third node acts the secondary receiver. Although the first and third nodes can act as a receiver and a transmitter, respectively, such roles thereof are not essential in the exemplary case and thus not considered herein.

In the case that the three nodes are operating in the sou roe-based FD mode, the first node acts as the primary receiver, the second node acts as the primary transmitter and the secondary receiver, and the third node acts as the secondary transmitter. Although the first and third nodes can act as a transmitter and a receiver, respectively, such roles thereof are not essential in the exemplary ease and thus not considered herein.

FIG. 1 is a diagram illustrating a system model operating in a destination-based three-node FD mode.

FIG. 1 depicts four nodes 110, 120, 130, and 140. The first node 110 has data to transmit, and the second node 120 is supposed to receive the data from the first node 110. The third and fourth nodes 130 and 140 are candidate destination nodes.

In FIG. 1 the first to fourth nodes 110, 120, 130, and 140 may be configured in the same fashion. A description is made based on the definitions made in association with the "destination-based three-node FD" in reference to FIG. 1. According to the definitions, the first node 110 acts as the primary transmitter, and the second node 120 acts as the primary receiver and the secondary transmitter. That is, this is the case where the first node 110 transmits a packet to the second node 120.

Next, the third and fourth nodes 130 and 140 may be candidate nodes for receiving the packet from the second node 120. If the third node 130 has a packet to receive from the second node 120, the third node 130 has the secondary receiver according to the above definition. The fourth node 140 may also be equivalent to the third node 130. For example, if the fourth node 140 has a packet to receive from the second node 120, the fourth node 140 has the secondary receiver according to the above definition.

As exemplified in FIG. 1, if the first node 110 transmits the packet to the second node 120, the third and fourth nodes 130 and 140 may experience inter-node interference caused by the packet transmitted from the first node 110 to the second node 120. Accordingly, in order for the second node 120 to determine the destination of the data between the third and fourth nodes 130 and 140, it is necessary to have the information, on the interference to the third and fourth nodes 130 and 140. Since the data destined for the third node 130 or the fourth node 140 is delivered by the second node 120 rather than the first node 110, the information on the interference measured by the third and fourth nodes 130 and 140 should be provided to the second node 120.

Like this, there is a need of a method for the third and fourth nodes 130 and 140 to overhear the packet transmitted from the first node 110 to the second node 120 and provide the interference strength information to the second node 120.

In the case of allocating new resources for allowing the third node 130 and/or the fourth node 140 to measure the strength of the inter-node interference caused by the packet transmitted from the first node 110 to the second node 120 and report the measurement result to the second node 120, this is likely to make it difficult to guarantee backward compatibility with the legacy systems as well as to cause resource waste. In order to overcome such a situation, the present invention is directed to a method for guaranteeing backward compatibility with the legacy systems without resource waste.

Figure 2A:
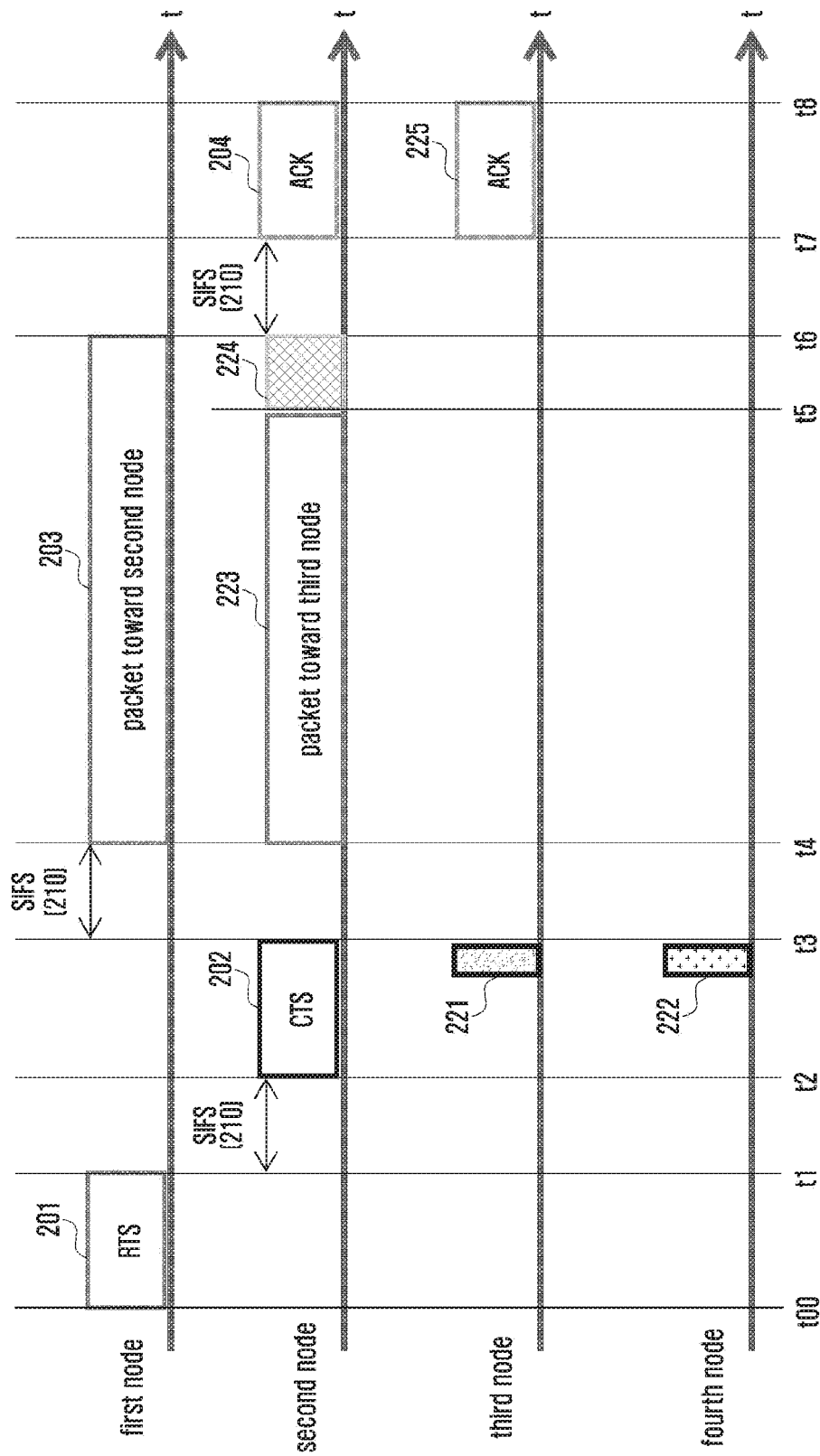

FIGS. 2A and 2B are timing diagrams illustrating packet transmission and inter-node interference strength measurement and report operations among the nodes in a destination-based FD mode according to an embodiment, of the present invention.

In reference to FIGS. 1, 2A and 2B a description is made of the inter-node packet transmission and interference strength measurement in the destination-based FD mode. It should be noted that FIGS. 2A and 2B are directed to exemplary cases where the second node 120 transmits and receives signals simultaneously in an FD mode.

In FIG. 2A, the second node 120 in the destination-based FD mode receives a packet from the first node 110 and transmits a packet to another node (e.g., third node 130), the packets transmitted by the first and second nodes 110 and 120 being different in length.

In reference to FIG. 2A, a description is made of the packet, transmission from the first node 110 to the second node 120. In FIG. 2A, the first node 110 has a packet to transmit to the second node 120. In this case, the first node 110 transmits a Request-To-Send CRTS) signal 201 to the second node 120 during a period between timepoints t00 and t1. Then, the second node 120 may wait for Short Interframe Space (SIFS) 210 as defined for a Wi-Fi system and subsequently transmit a Clear-To-Send (CTS) signal 202 to the first node 110 during a period between timepoints t2 and t3. The first node 110 may transmit the packet to the second node 120 during a period between t4 and t6 after the expiry of the SIFS 210. If the packet 203 is received during the period between t4 and t6 from the first node 110, the second node 120 may wait for the SIFS 210 between t6 and t7 and subsequently transmit an acknowledgement 204 to the first, node 110 during a period between t7 and 18 FIG. 2A exemplifies a ease where a positive acknowledgement signal (ACK) is transmitted.

The above-described packet transmission from the first node 110 to the second node 120 is equivalent to the operation in the half-duplex mode adopted in legacy Wi-Fi systems.

A description is first made of the interference measurement and report in the half-duplex mode before explaining data transmission in the full-duplex mode.

The third and fourth nodes 130 and 140 may overhear the RTS signal 201 that is transmitted from the first node 110 to the second node 120 for packet transmission to measure the strength of inter-Node Interference (INI). This means that the first node 110 is configured not to transmit any extra signal for INI strength measurement so as to guarantee backward compatibility with legacy systems in the present invention.

In order to guarantee backward compatibility with legacy systems, it may also be necessary to prevent the third and fourth nodes 130 and 140 from being allocated separate resources for transmitting INI strength information to the second node 120. For this purpose, the present invention uses the characteristics of the FD system. As described above, the second node 120 operates in the FD mode and thus can transmit, data or signals to one node and receive data or signals from another node simultaneously. This means that the second node 120 may transmit the CTS 202 and simultaneously receive a signal.

According to an embodiment of the present invention, the third and fourth nodes 130 and 140 measure the strength of the RTS signal 201 transmitted from the first node 110 to the second node 120 and transmit the measured INI strengths 221 and 222, respectively, during the period while the second node 120 transmits the CIS signal 202 to the first node 110. That is, the third node 130 transmits the measured INI strength information 221 to the second node 120 during the period while the second node 120 transmits the CTS signal 202 to the first node 110, and the fourth node 140 transmits the measured INI strength information 222 to the second node 120 during the period while the second node 120 transmits the CTS signal 202.

Then the second node 120 may determine the secondary receiver based on the INI strengths received from the third and fourth nodes 130 and 140. The second node 120 may determine one of the third and fourth nodes 130 and 140 as the secondary receiver in consideration of other information sis-, well as the INI strength information. For example, the second node 120 may determine one of the third and fourth nodes 130 and 140 as the secondary receiver in consideration of fairness, priority, and traffic buffer slants as well as the INI strength, in the following description, however, it is assumed that the second receiver is selected based on only the INI strength for convenience of explanation and to help in understanding the present invention.

FIG. 2A exemplifies a case where the second node 120 determines the third node 130 as the secondary receiver because the INI strength measured at the third node 130 is low. If the third node 130 is selected as the secondary receiver, the second node 120 may transmit a packet to the third node 130 while simultaneously receiving another packet from the first node 110.

Here, it may occur that the length of the packet transmitted from the second node 120 to the third node 130 is shorter than that of the packet transmitted from the first node 110 to the second node 120. For example, it may occur that the packet transmission from the first node 110 to the second node 120 is performed during the period between timepoints t04 and t06 while the packet transmission from the second node 120 to the third node 130 is performed during the period between timepoints t04 and t05. In this case, other nodes, e.g. fourth node 140 and other equivalent nodes (not shown in FIG. 1), may not be aware of the packet transmission from the first node 110 to the second node 120. As a consequence, the nodes which, are not aware of the packet transmission from the first node 110 to the second node 120 may wait for SIFS stalling from the timepoint t05 when the packet transmission from the second node 120 to the third node 130 is completed and subsequently transmit an RTS for data transmission. If the RTS transmission is performed for new data transmission in this way, this may lead to two different reference timepoints and thus break the system synchronization, resulting in total system communication breakdown.

In order to avoid such a situation, the present invention proposes an operation in which the second node 120 transmits a specific signal, i.e., busy tone 224, during a period after the packet transmission from the second node 120 to the third node 130 has been completed, yet within the period for the packet transmission from the first node 110 to the second node 120, i.e., the period between the points t05 and t06. That is, if the length of the packet 223 transmitted from the second node 120 to the third node 130 is shorter than that of the packet 203 transmitted from the first node 110 to the second node 120, the second node 120 transmits the busy tone 224 or a signal indicating presence of data transmission between specific nodes during the time remaining after the packet transmission, i.e., the period between timepoints t05 and t06. By matching the packet transmission, complete time from the first node 110 to the second node 120 and the packet transmission complete time from the second node 120 to the third node 130 in this way, it is possible to protect system synchronization from being lost.

If the packet transmitted by the second node 120 is received, the third node 130 may wait for SIFS 210 and subsequently transmit the acknowledgement signal 225 to the second node 120. This makes it possible to match the transmission timings of the acknowledgement signal 225 and the acknowledgement signal 204 from the second node 120 to the first node 110. FIG. 2A exemplifies a case where a positive acknowledgement signal (ACK) is transmitted from the third node 130 to the second node 120.

A description is made hereinafter with reference to FIG. 2B in comparison with FIG. 2A. In FIG. 2B, the same reference numbers are used for the identical parts in FIG. 2A. Also a detailed description of the same parts as those illustrated in FIG. 2A is omitted herein.

FIG. 2B is directed to a case where the length of a packet transmitted from the second node 120 to the third node 130 is equal to or longer than that of the packet 203 transmitted from the first node 110 to the second node 120. Here, the first node 110 cannot know the length of the packet transmitted from the second node 120 to the third node 130. In contrast, the second node 120 may know the length of the packet transmitted from the first node 110 to the second node 120.

In the case that the length of the packet from the second node 120 to the third node 130 is equal to or longer than that of the packet from the first node 110 to the second node 120, the second node 120 may set the length of the packet to be transmitted from the second node 120 to the third node 130 to be equal to that of the packet 203 transmitted from the first node 110 to the second node 120. If the length of the packet from the second node 120 to the third node 130 is equal to that of the packet from the first node 110 to the second node 120, the second node 120 may transmit the packet to the third node 130 in the same length as that of the packet from the first node 110 to the second node 120.

In contrast, if the length of the packet from the second node 120 to the third node 130 is longer than that of the packet from the second node 120 to the third node 130, the second node 120 sets the length of the packet from the second node 120 to the third node 130 to be equal to the length of the packet from the first node 110 to the second node 120. In this case, the remaining part of the packet from the second node 120 to the third node 130 may be transmitted during the next transmission period.

At the timepoint t06 when the packet transmission of the second node 120 is completed, the third node 130 waits for the duration of SIFS 210 and subsequently transmits an acknowledgement signal during a period between timepoints t07 and t08. Like FIG. 2A. FIG. 2B is directed to an exemplary case of transmitting a positive acknowledgement signal (AGK). The second node 120 may receive the packet 203 from the first node 110 by the timepoint t06, wait for the duration of SIFS 210, and subsequently transmit the acknowledgement signal during a period between timepoints t07 and t08. Like FIG. 2A, the positive acknowledgement signal (ACK) is transmitted in the embodiment.

If three nodes are communicating in the FD mode as described with reference to FIGS. 2A and 2B, it may be possible to improve the total system transmission efficiency and resource utilization efficiency. Assuming that the second node 120 is an Access Point (AP) of a Wi-Fi system in FIGS. 2A and 2B, it can transmit and receive signals simultaneously so as to improve data throughput of the system.

As described with reference to FIGS. 2A and 2B, the method of the present invention makes it possible for two or more nodes, e.g., the third and fourth nodes 130 and 140, to provide the INI strength information, in order for the second node 120 to receive the INI strength information provided by other nodes accurately, it is necessary to avoid overlap between INI information transmissions from different nodes. Therefore, a method is needed that makes it possible for multiple nodes to transmit the INI strength information to one node efficiently.

A description is made of the INI strength information transmission method according to an embodiment of the present invention with reference to FIG. 1.

In order to report the INI strength information, one of the two methods may be selected. First, it may be possible to allocate resources to a node for INI strength information report. Second, it may be possible for a node to determine the resources autonomously for INI strength information report.

The INI strength information-generating nodes should be allocated resources (e.g., subcarriers, sub-bands, and time slots) and transmit the INI strength information with the corresponding resources in order for the INI strength information-consuming node to acquire the INI strength information correctly. For example, the second node 120 has to receive the INI strength information from the third and fourth nodes 130 and 140. In this case, the second node 120 may allocate different resources to the third and fourth nodes 130 and 140. Then the third and fourth nodes 130 and 140 may measure the strength of the signal or the packet transmitted from, the first node 110 to the second node 120 to generate the INI strength information and transmit the INI strength information to the second node 120 using the allocated resources.

A description is made of the method for the third and fourth nodes 130 and 140 to provide INI strength information without resource allocation from the second node 120. In this case, the INI strength information generating nodes (e.g. the third and fourth nodes 130 and 140) do not receive any information on the resources for use thereby from the second node 120. Accordingly, the third and fourth nodes 130 and 140 have to determine the resources for use thereby autonomously. Here, the third and fourth nodes 130 and 140 may select resources randomly. In the case of selecting resources randomly, however, the third and fourth nodes 130 and 140 may select the same resources. Therefore, a method is needed to prevent the INI strength information-generating nodes from selecting the same resources. In order to accomplish this, the use of unique identity information, e.g., MAC address, assigned per node for configuring resources may be considered. Here, the resources may be subcarriers, sub-bands, or timeslots, as aforementioned.

The INI strength information-generating nodes may also be configured to transmit the INI strength information in the form of an inverse echo power signal in consideration of interference channels or to inform of only the presence/absence of interference i.e., presence/absence of a packet from the first node 110 to the second node 120.

Hereinafter, a description is made of the types of resources for transmitting INI strength information and the method for allocating the corresponding resources with reference to the accompanying drawings.

Figure 3A:
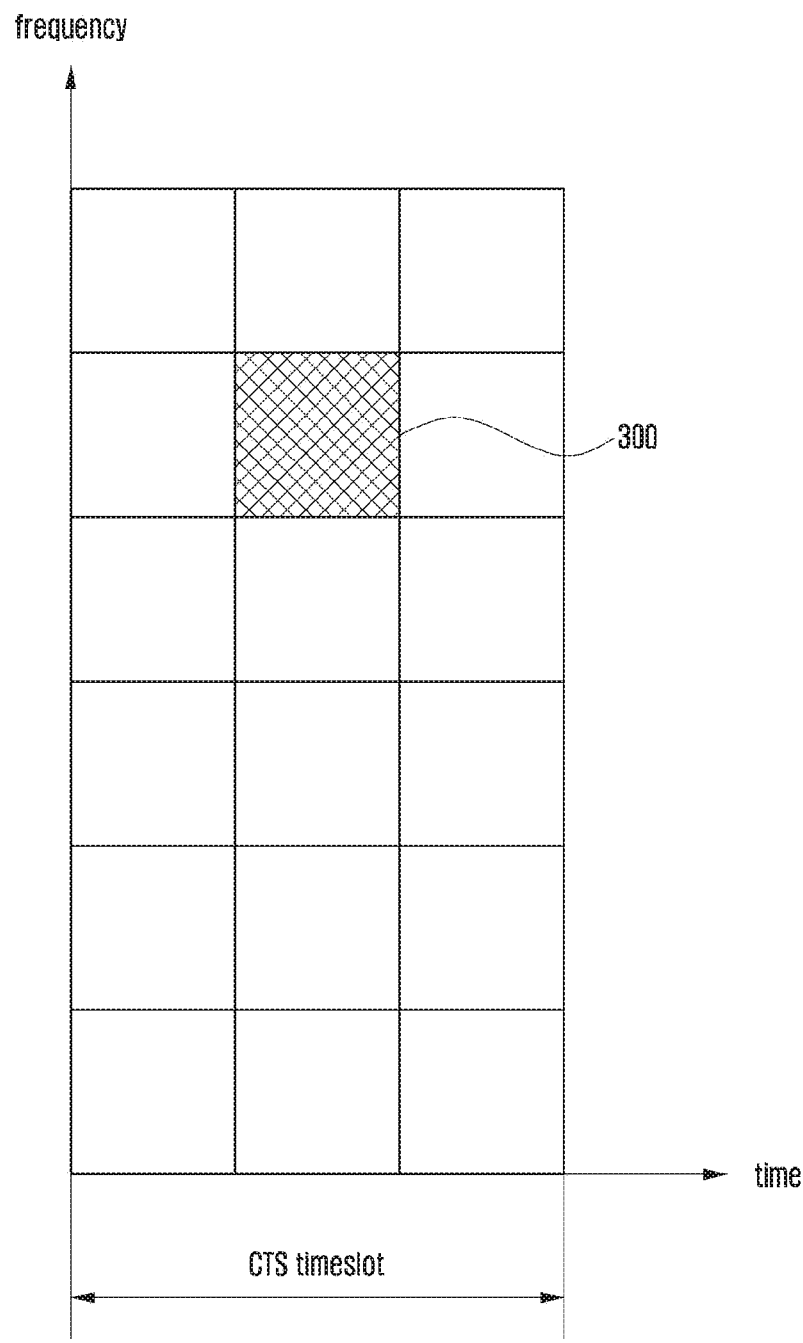
FIGS. 3A to 3C are diagrams illustrating methods for transmitting INI strength information during a CTS period according to an embodiment of the present invention.
Figure 3B:
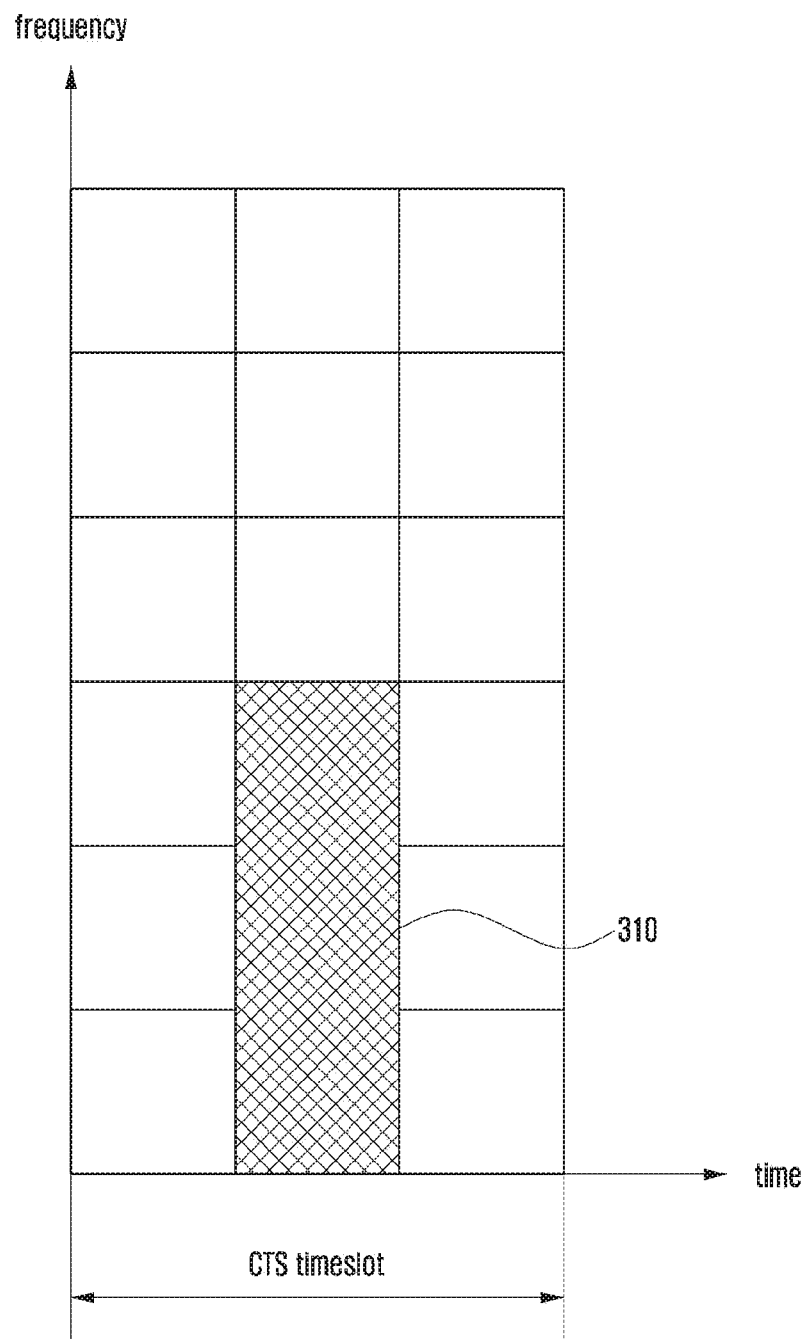
Figure 3C:
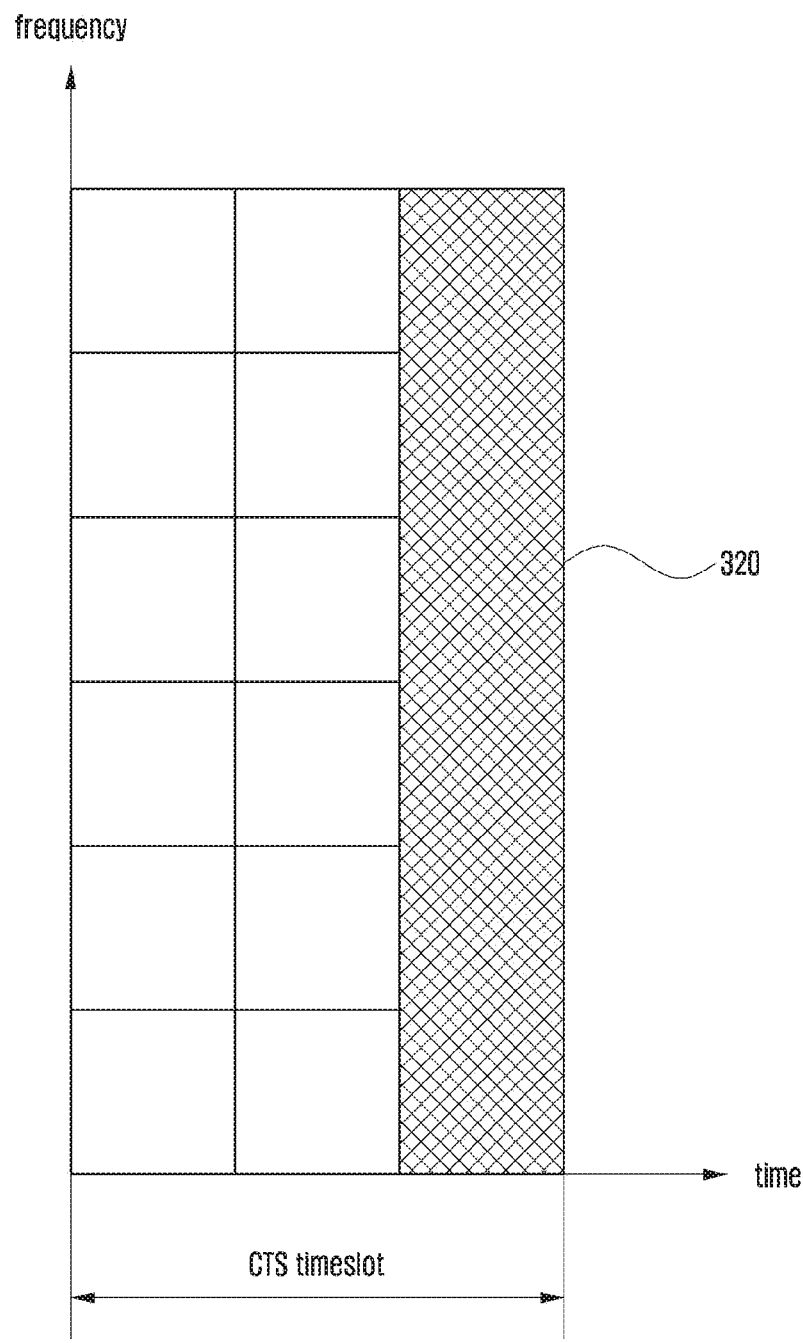

FIGS. 3A to 3C are diagrams illustrating methods for transmitting INI strength information during a CTS period according to an embodiment of the present invention.

FIG. 3A exemplifies a method for transmitting the INI strength information with a specific subcarrier during the CTS period. FIG. 3B exemplifies a method for transmitting the INI strength information with part of a specific timeslot during the CTS period, and FIG. 3C exemplifies a method for transmitting the INI strength information with a specific time slot during the CTS period. In the embodiments of FIGS. 3A to 3C, the INI strength information may be transmitted in the form of an inverse echo power signal.

In reference to FIG. 3A, a CTS period consists of 3 timeslots, and the INI strength information, is mapped to a subcarrier 300 in the central one of the three timeslots. In FIG. 3A, the subcarrier of the time slot to which the INI strength information is mapped may be the resource allocated to or selected by one node. For example, if the third node 130 of FIG. 1 is allocated or selects the resource 300 of FIG. 3A, the fourth node 140 may be allocated or select one equivalent resource in the remaining resources.

Here, the INI strength information mapped to the selected resource may be the inverse echo power calculated by equation 1.

$$P_C = \frac{K}{P_A |h_{AC}|} \quad \text{[Equation 1]}$$

Here, $P_C$ denotes the transmit power for transmitting the INI strength information to the third of fourth node, K denotes a constant, $P_A$ denotes the transmit power of the first node, and $h_{AC}$ denotes a channel between the first and the third nodes or between the first and fourth nodes.

In reference to FIG. 3B, the CTS period consists of 3 timeslots as described above, and the INI strength information is mapped, to sub-band 310 comprised of three consecutive subcarriers in the central one of the three timeslots of the CTS period. The sub-band configured for transmitting the INI strength information as shown in FIG. 3B may be the resource allocated to or selected by one node. For example, if the third node 130 of FIG. 1 is allocated or selects the resource 310 as shown in FIG. 3B, the fourth node 140 may be allocated or select, one equivalent unit resource in the remaining resources.

Even in this case, the INI strength information may be configured based on the inverse echo power calculated by equation 1.

In reference to FIG. 3C, the CTS period consists of 3 timeslots as described above, and the INI strength in form a lion is mapped to the last one of the three timeslots across all subcarriers 320. The timeslot 320 to which the INI strength information is mapped as shown in FIG. 3C may be the resources allocated to or selected by one node. For example, if the third node 130 of FIG. 1 is allocated or selects the resource 320 as shown in FIG. 3C, the fourth node 140 may be allocated or select one equivalent unit resource in the remaining resources.

Even in this case, the INI strength information may be configured based on the inverse echo power calculated by equation 1. The resource allocation determination for selecting one subcarrier, one sub-band, or one times lot may be made with the MAC address of the communication device. Assuming that the MAC address of a communication device is "08:56:27:6f:2b:9c", "08:56:27" is a vender ID, and "6f:2b:9c" is a device identifier (Card ID). Accordingly, it may be possible to determine the resource to be allocated to the corresponding device by performing a modulo operation on the number of allocable resources and the last two digits of the Card ID.

For example, "9c" can be expressed as a decimal number of 156. Here, if the number of allocable resources is "52×4", 156 modulo 208 is 156. Also, "E6" can be expressed as a decimal number of 230. Here, if the number of allocable resources is 52×4", 230 modulo 208 is 22. The INI strength information may be transmitted using the resource corresponding to the number determined through the modulo operation.

Using the above-described method, the second node 120 may estimate Signal-to-Interference Ratio (SIR) based on the INI strength information received from the third and fourth nodes 130 and 140 so as to determine a Modulation and Coding Scheme (MCS) level more accurately. The second node 120 may reflect the per-link channel qualities to scheduling to improve system capacity. For example, a node experiencing interference equal to or less than a predetermined threshold and a node experiencing interference greater than the threshold may be allocated different resource regions in a CTS times lot for INI strength information feedback. For example, the OFDM symbols of a CTS time slot may be sorted into two parts, the beginning part being allocated to the nodes experiencing interference equal to or less than the threshold, the ending part being allocated to the nodes experiencing interference greater than the threshold. In this case, it may be possible to decrease the collision probability among the nodes capable of receiving packets by increasing the number of OFDM symbols allocated to the nodes experiencing interference equal to or less than the threshold.

Figure 4:
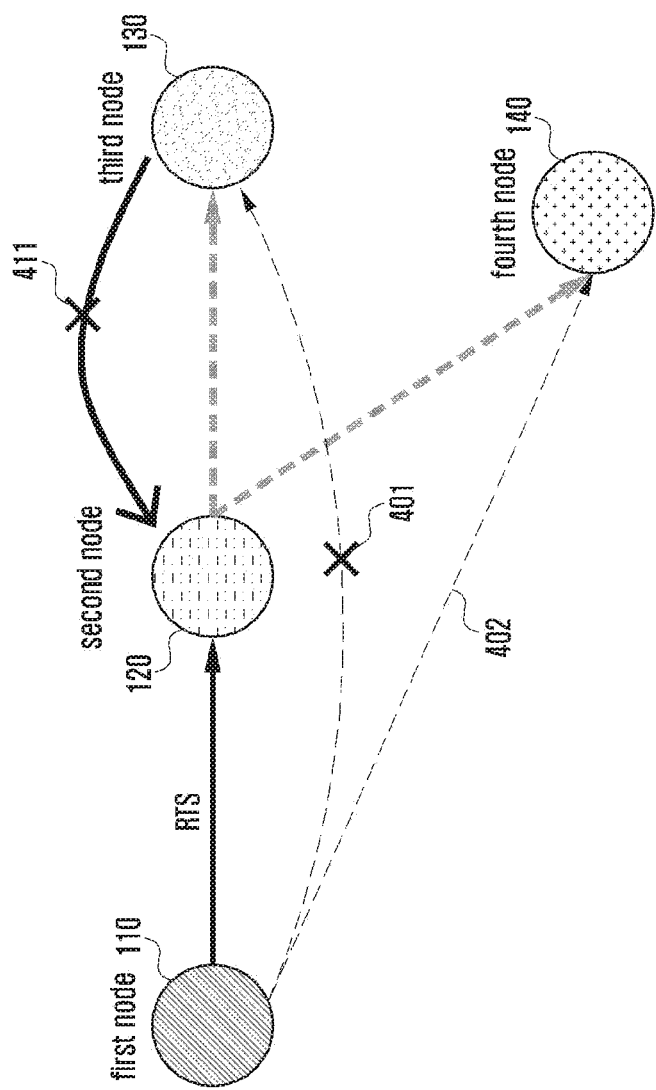
FIG. 4 is a diagram illustrating an exemplary situation of transmitting and receiving packets in a destination-based FD mode according to an embodiment of the present invention.

FIG. 4 is a diagram illustrating an exemplary situation of transmitting and receiving packets in a destination-based FD mode according to as embodiment of the present invention.

FIG. 4 depicts an exemplary case which is similar in situation to that of FIG. 1 but in which a specific node does not an RTS signal. The description thereof is made in more detail with reference to FIG. 4.

In reference to FIG. 4, the second node 120 is located between the first and third nodes 110 and 130. The third node 130 cannot receive a signal transmitted from the first node 110 to the second node 120 as denoted by reference number 401. This means that the third node 130 cannot receive the RTS signal transmitted by the first node 110 and thus cannot report INI strength information to the second node 120. Since the third node 130 cannot receive the RTS signal transmitted by the first node 110, it does not report the INI interference information as denoted by reference number 411. Also, if the third node 130 cannot receive the RTS signal transmitted from the first node 110 to the second node 120, this means that the packet transmitted from the first node 110 to the second node 120 incurs no or ignorable interference to the third node 130.

Meanwhile, the fourth node 140 may overhear the RTS signal transmitted from the first node 110 to the second node 120 as denoted by reference number 402. Accordingly, the fourth node 140 has to transmit INI strength information to the second node 120 as described above. How the fourth node 140 reports the INI strength information to the second node 120 has been described above; thus. FIG. 4 does not depict that operation.

It is assumed that the second node 120 is aware of the presence of the first node 110, the third node 130, and the fourth node 140.

In this state, the second node 120 may receive the RTS signal from the first node 110 and any INI strength information from the fourth node 140 during one of the periods for transmitting a CTS signal to the first node 110. However, the second node 120 does not receive any INI strength information from the third node 130 during any period for transmitting the CTS signal to the first node 110.

If no INI strength information feedback is received by the second node 120 from the third node 130, the second node 120 may operate under the assumption that it has received a feedback indicating no or ignorable INI caused by the first node from the third node 130. In the following description, such a situation where no INI strength information feedback is received from a known node is called "Implicit CQI Feedback" situation.

That is. FIG. 4 depicts a case where the second node 120 receives an implicit CQI feedback from the third node 130 and a measurement-based INI strength information feedback from the fourth node 140. In this case, the second node 120 may determine the secondary receiver for the destination-based FD mode based on the INI strength information received from the fourth node 140 and the implicit CQI feedback.

Figure 5:
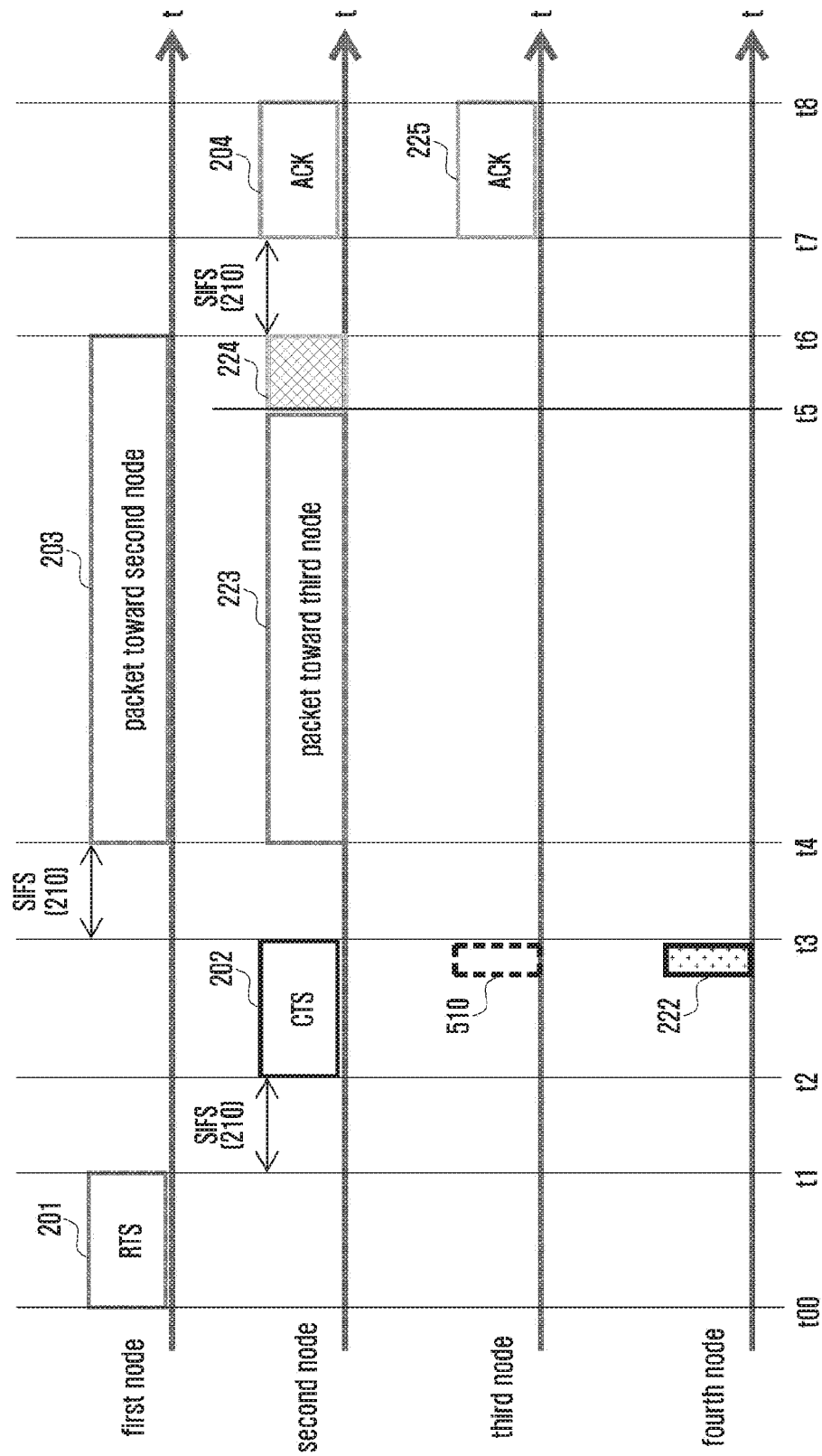
FIG. 5 is a timing diagram illustrating data transmission/reception timings in a destination-based three-node FD system according to an embodiment of the present invention.

The operations of the nodes in FIG. 4 are further elaborated with reference to FIG. 5.

FIG. 5 is a timing diagram illustrating data transmission/reception timings in a destination-based three-node FD system according to an embodiment of the present invention.

FIG. 5 depicts the timings in the same situation, considered in FIG. 2A. That is, the first node 110 transmits packet data to the second node 120 while the second node 120 transmits packet data to the third node 130. Hie length of the packet transmitted from the second node 120 to the third node 130 is shorter than the length of the packet transmitted from the first node 110 to the second node 120.

The operations depicted in FIG. 5 are identical with those of FIG. 2A in general. The first node 110 transmits the RTS signal 201 during the period between the timepoints 100 and 101. Then the second node 120 may wait for the SIFS 210 defined for a Wi-Fi system and subsequently transmit the CTS signal 202 to the first node 110 during the period between timepoints t02 and t03. The first node 110 may transmit the packet to the second node 120 during a period between t04 and t06 after the expiry of the SIFS 210. If the packet 203 is received during the period between 104 and t06 from the first node 110, the second node 120 may wait for the SIFS 210 between t06 and t07 and subsequently transmit an acknowledgement 204 to the first node 110 during a period between t07 and t08.

Next, the third and fourth nodes 130 and 140 may overbear the RTS signal 201 that is transmitted from the first node 110 to the second node 120 for packet transmission to measure INI strength. As described with refence to FIG. 4, however, the third node 130 may not receive the RTS signal 201 transmitted from the first node 110 to the second node 120. Accordingly, as shown in FIG. 5, only the fourth node 140 measures the strength, of the RTS signal 201 transmitted from the first node 110 to the second node 120 and transmits the measured INI strength information signal 222 during the period con figured for transmitting the CTS signal 202 from the second node 120 to the first node 110.

The third node 130 cannot substantially transmit the INI strength information 510 to the second node 120. In order to indicate the impossibility of transmitting INI strength information, the signal is drawn with a dotted line. It should be noted that the second node 120 receives an implicit CQI feedback 510 which is not substantially transmitted as described with reference to FIG. 4.

The second node 120 may configure the third node 130 as the secondary receiver operating in the destination-based three-node FD mode based on the implicit CQI feedback 510 and the received INI strength information 222.

As described above, it may occur that the length of the packet transmitted from the second node 120 to the third node 130 is shorter than that of the packet transmitted from the first node 110 to the second node 120. For example, the packet transmission from the first node 110 to the second node 120 is performed during the period between timepoints t04 and t06 while the packet transmission from the second node 120 to the third node 130 is performed during the period between timepoints t04 and t05.

In order to avoid synchronization loss caused by packet transmission timing mismatch, the present invention proposes an operation in which the second node 120 transmits a specific signal, i.e., busy tone 224, during the period after the packet transmission from the second node 120 to the third node 130 has been completed, yet within the period for the packet transmission from the first node 110 to the second node 120, i.e., the period between timepoints t05 and t06. That is, if the length of the packet 223 transmitted from the second node 120 to the third node 130 is shorter than that of the packet 203 transmitted from the first node 110 to the second node 120, the second node 120 transmits the busy tone 224 or a signal indicating presence of data transmission between specific nodes during the time remaining after the packet transmission, i.e., the period between timepoints t05 and t06. By matching the packet transmission complete time from the first node 110 to the second node 120 and the packet transmission complete time from the second node 120 to the third node 130 in this way, it is possible to protect system synchronization from being lost. If the packet transmitted by the second node 120 is received, the third node 130 may wait for SIFS 210 and subsequently transmit the acknowledgement signal 225 to the second node 120. This makes it possible to match the transmission timings of the acknowledgement signal 225 and the acknowledgement signal 204 from the second node 120 to the first node 110.

Meanwhile, it may occur that the length of the packet transmitted from the second node 120 to the third node 130 is longer than that of the packet transmitted from the first node 110 to the second node 120 as described with reference to FIG. 2B. In this case, the second node 120 may adjust the length of the packet transmitted from the second node 120 to the third node 130 according to the length of the packet transmitted from the first node 110 to the second node 120 as described above. This is because the first node 110 is not aware of the length of the packet transmitted from the second node 120 to the third node 130 and thus cannot adjust the packet size according to the length of the packet transmitted from the second node 120 to the third node 130.

The remaining part of the packet from the second node 120 to the third node 130 may be transmitted during the next transmission period (access period).

Figure 6:
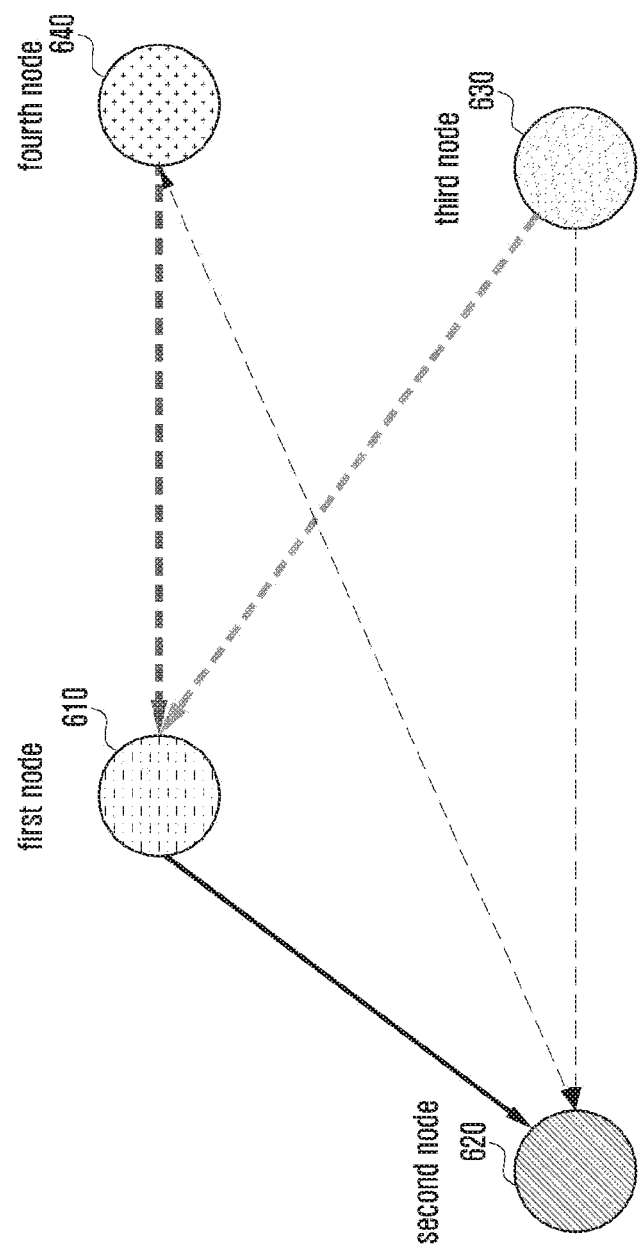
FIG. 6 is a diagram illustrating a system model operating in a source-based three-node FD mode.

FIG. 6 is a diagram illustrating a system model operating in a source-based three-node FD mode.

The first node 610 acts as a primary transmitter and a secondary receiver in the source-based three-node FD system according to an embodiment of the present invention. The first and second nodes 610 and 620 have packets to transmit. The third and fourth nodes 630 and 640 may be candidate secondary transmitters having packets to transmit to the first node 610.

In the three-node FD system according to an embodiment of the present invention, if one of the third and fourth nodes 630 and 640 transmits pack et data to the first node 610, the first node 610 may receive the packet data transmitted by the third node 630 or the fourth node 640. While receiving the packets, the first node 610 may also transmit packet data to the second node 620. That is, the first node 610 may operate in the full duplex mode.

In such a situation, the second node 620 may suffer INI caused by the packet data transmitted from the third node 630 or the fourth node 640 to the first node 610. Accordingly, it is necessary for the third node 630 or the fourth node 640 to determine whether to transmit a packet to the first node 610 in consideration of the interference to the packet transmitted from the first node 610 to the second node 620.

In an embodiment of the present invention, the third and fourth nodes 630 and 640 overhear the RTS signal transmitted from the first node 610 to the second node 620 for packet data transmission and the CIS transmitted from the second node 620 to the first node 610 for accepting the packet transmission. Then the third and fourth nodes 630 and 640 may estimate INI strength based on the CTS transmitted from the second node 620 to the first node 610, perform power control based on the estimated INI strength, and transmit the packet data to the first node 610. Here, the decision for selecting a node for transmitting packet data to the first node 610 between the third and fourth nodes 630 and 640 may be made according to a predetermined rule.

Whether to select the third node 630 or the fourth node 640 for packet transmission to the first node 610 may be determined based on the INI signal estimated based on the CTS signal transmitted from the second node 620 to the first node 610. A description is made of the method for the third node 630 to determine which one of the third and fourth nodes 630 and 640 transmits a packet based on the INI signal strengths estimated at the third and fourth nodes 630 and 640.

The third node 630 determines, whether to transmit a packet based on the strength of the CTS signal transmitted from the second node 620 to the first node 610. Accordingly, the third node 630 has to estimate the strength of the CTS signal transmitted from the second node 620 to the first node 610. It may be necessary to compare the estimated CTS signal strength with a first and a second threshold to determine whether to perform transmission.

In the first example, it may occur that the third node 630 overhears the RTS signal transmitted by the first node 610 but not the CTS signal transmitted by the second node 620. This may indicate presence or almost no presence of interference between the second and third nodes 620 and 630. Accordingly, if the third node 630 overhears the RTS but not the CTS, it may transmit packet data to the first node 610 without any restriction.

Next, it may occur that the third node 630 overhears both the RTS signal transmitted from the first node 610 to the second node 620 and the CTS signal transmitted from the second node 620 to the first node 610. In this case, it may be configured to take one of the three actions as follows.

(1) If the estimated strength of the CTS signal transmitted from the second node 620 to the first node 610 is equal to or less than a predetermined first threshold, the third node 630 may transmit packet data to the first node 610 without any restriction.

(2) If the estimated strength of the CTS signal transmitted from the second node 620 to the first node 610 is greater than the first threshold, the third node 630 may determine whether the estimated strength of the CTS signal is equal to or less than a predetermined second threshold. If it is determined that the estimated strength of the CTS sign al transmitted from the second node 620 to the first node 610 is greater than the first, threshold and equal to or less than, the second threshold, the third node 630 may perform packet transmission to the first node 610 at a controlled power level.

(3) If the estimated strength of the CTS signal transmitted from the second node 620 to the first node 610 is greater than the second threshold, this is the case where the third node 630 cannot transmit a packet.

As described above, the first threshold may be a maximum interference strength allowed for packet data transmission without any restriction, and the second threshold value may be the maximum interference strength allowed after power reduction in consideration of interference when transmitting a packet to the first node 610. The fourth node 640 may also operate as described above.

Figure 7A:
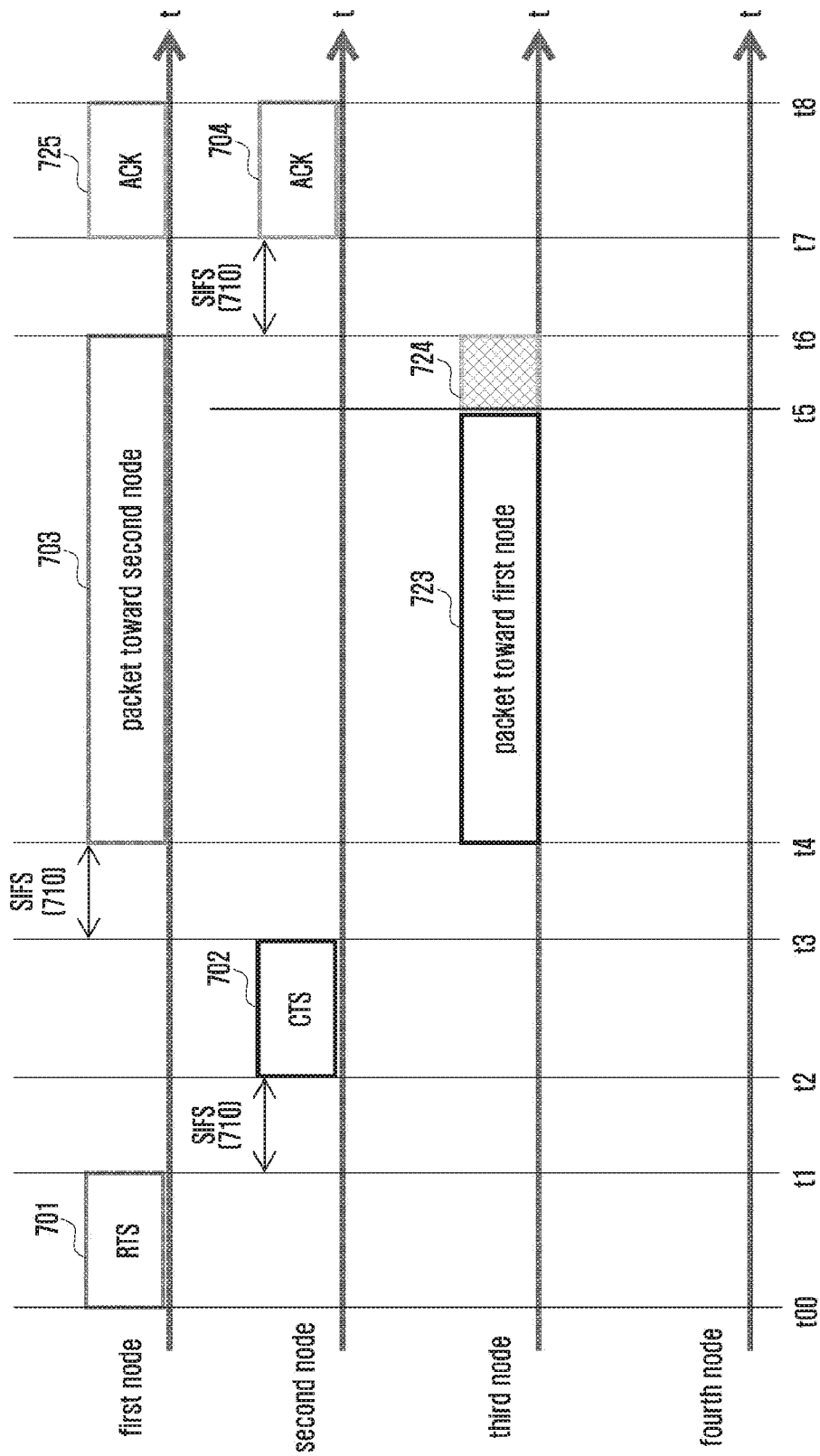
FIGS. 7A and 7B are timing diagrams illustrating packet transmission timings in a source-based three-node FD mode according to an embodiment of the present invention.

As described above, the third node 630 or the fourth node 640 acts as the secondary transmitter, and the first node 610 acts as the secondary receiver. The conditions for packet data transmission from the secondary transmitter to the secondary receiver may be expressed as shown in Table 1.

system and subsequently transmit a CTS) signal 702 to the first node 610 during a period between timepoints t02 and t03. The first, node 610 may watt for the SIFS 710 and subsequently transmit, a packet to the second node 620 during a period between timepoints t04 and t06. If the packet 703 is received from the first node 610 during the period between timepoints t04 and t06, the second node 620 may wait for the SIFS 710 between timepoints t06 and t07 and subsequently transmit an acknowledgement signal 704 to the first node 610 during a period between timepoints t07 and t08. FIG. 7A exemplifies a ease where a positive acknowledgement (ACK) is transmitted.

The above-described packet transmission from the first node 610 to the second node 620 is equivalent to the operation in the half-duplex mode adopted in legacy Wi-Fi systems.

A description is first made of the interference measurement and report, in the half-duplex mode before explaining data transmission in the full-duplex mode.

The third and fourth nodes 630 and 640 may overhear the RTS signal 701 which is transmitted from the first node 610 to the second node 620 for packet transmission and the CTS signal 702 transmitted from the second node 620 to the first node 610 in response to the RTS signal 701. The third and fourth nodes 630 and 640 may estimate INI strength based on the overheard CTS signal 702.

The third and fourth nodes 630 and 640 may not substantially measure the INI. This is because the time for the third node 630 or the fourth node 640 to transmit a packet to the first node 610 is identical with the time for the second node 620 to receive a packet from the first node 610. Accordingly, when transmitting a packet to the first node 610, the third node 630 or the fourth node 640 may estimate a channel between the second and third nodes 620 and 630 of between

TABLE 1

| Classification | RTS overhearing | CTS overhearing | Packet Transmission scheme |
| --- | --- | --- | --- |
| Secondary transmitter determines whether to transmit packets to secondary receiver | Overhearing possible | Overhearing impossible | Packet transmission without restriction |
| | | ≤first threshold | Packet transmission without restriction |
| | | First threshold ≤ estimated CTS strength ≤ second threshold | Packet transmission at control power level |
| | | Estimated CTS strength ≥ second threshold | Packet transmission impossible |

Figure 7B:
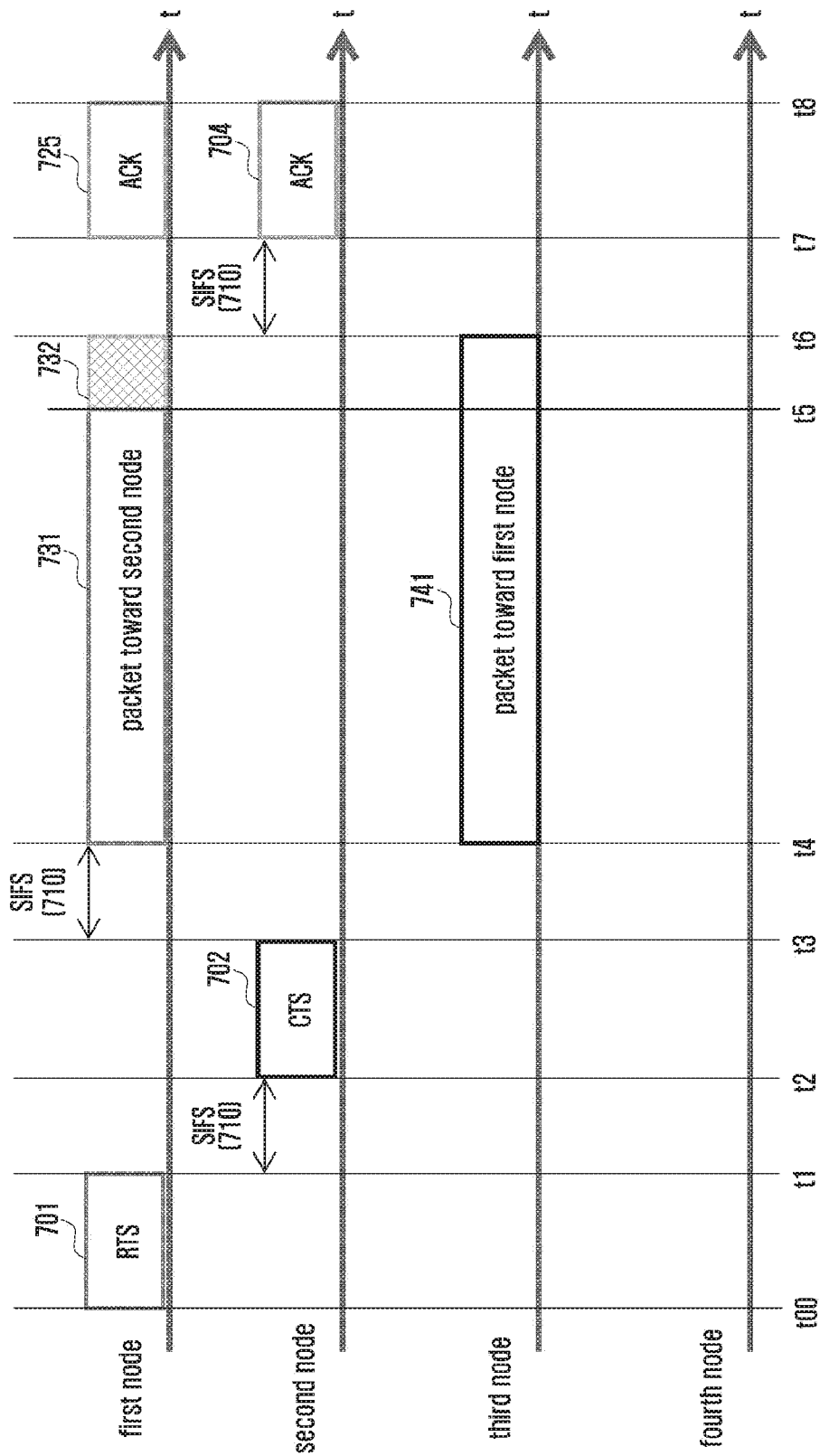

FIGS. 7A and 7B are timing diagrams illustrating packet transmission timings in a source-based three-node FD mode according to an embodiment of the present invention.

FIG. 7A exemplifies a case where the length of the packet, transmitted from the primary transmitter to the primary receiver is longer than the length of the packet transmitted from the secondary transmitter to the secondary receiver in the source-based three-node FD mode, and FIG. 7B exemplifies a case where the length of the packet transmitted from the primary transmitter to the primary receiver is shorter than the length of the packet transmitted from the secondary transmitter to the secondary receiver in the source-based three-node FD mode.

In FIG. 7A, the First node 610 has a packet to transmit to the second node 620. In this ease, the first node 610 transmits au RTS signal 701 to the second node 620 during a period between timepoints t00 and t01. Then, the second node 620 may wait for the SIFS 710 as defined for a Wi-Fi the second and fourth nodes 620 and 640 based on the CTS signal 702 transmitted from the second node 620 to the first node 610.

Although there is no packet or signal exchange between the second and third nodes 620 and 630 or between the second and fourth nodes 620 and 640, if is necessary to estimate channel status therebetween for operating in the FD mode. In an embodiment of the present invention, one of the third and fourth nodes 630 and 640 as candidate secondary transmitters may estimate a channel established with the second node 620 operating as the primary receiver based on the CTS signal 702 transmitted from the second node 620 to the first node 610. Since it is not necessary for the second node 620 to transmit any signal to the candidate secondary transmitter 630 and 640 for the purpose of INI strength measurement, the present invention is capable of guaranteeing backward compatibility with legacy systems.

FIG. 7A exemplifies a case where the third node 630 can perform packet transmission because the channel state estimated by the third node 630 is equal to or less than a first or a second threshold and the fourth node 640 cannot perform packet transmission because the channel state estimated by tire fourth node 640 is greater than the second threshold. In this case, the third node 630 may be determined as the secondary transmitter to transmit a packet to the first node 610.

Here, it may occur that the length of the packet transmitted from the third node 630 to the first node 610 is shorter than that of the packet transmitted, from the first node 610 to the second node 620. For example, it may occur that the packet transmission from the first node 610 to the second node 620 is performed during the period between timepoints t04 and t06 while the packet transmission from the third node 630 to the first node 610 is performed during the period between timepoints t04 and t05. In this case, other nodes, e.g. fourth node 640 and other equivalent nodes (not shown in FIG. 6), may not be aware of the packet transmission from the third node 630 to the first node 610. As a consequence, the nodes which are not aware of the packet transmission from the third node 630 to the first node 610 may wait for SIFS starting from the timepoint t05 when the packet transmission from the third node 630 to the first node 610 is completed and subsequently transmit an RTS for data transmission.

If the RTS transmission is performed for new data transmission in this way, this may lead to two different reference timepoints and thus break the System synchronization, resulting in total system communication breakdown.

In order to avoid such a situation, the present invention proposes an operation in which the third node 630 transmits a specific signal, i.e., busy tone 724, during a period after the packet transmission from the third node 630 to the first node 610 has been completed, yet within the period for the packet transmission from the first node 610 to the second node 620, i.e., the period between timepoints t05 and t06. That is, if the length of the packet 723 transmitted from the third node 630 to the first, node 610 is shorter than that of the packet 703 transmitted from the first node 610 to the second node 620, the third node 630 transmits the busy tone 724 or a signal indicating presence of data transmission between specific nodes during the time remaining after the packet transmission, i.e., the period between timepoints t05 and t06. By matching the packet transmission complete time from the first node 610 to the second node 620 and the packet transmission complete time from the third node 630 to the first node 610 in this way it is possible to protect system synchronization from being lost.

If the packet transmitted by the third node 630 is received, the first node 610 may wait for SIFS 710 and subsequently transmit the acknowledgement signal 725 to the third node 630. This makes it possible to match the transmission timings of the acknowledgement signal 725 and the acknowledgement signal 704 from the second node 620 to the first node 610. FIG. 7A exemplifies a ease where a positive acknowledgement signal (ACK) is transmitted from the first node 610 to the third node 630.

A description is made hereinafter with reference to FIG. 7B. FIG. 7B is directed to a case where the length of the packet transmitted from the third node 630 to the first node 610 is longer than that of the packet transmitted from the first node 610 to the second node 620. It should be noted that only the reference numbers of the packets exchanged between nodes are changed in comparison with FIG. 7a. In the following description, description of the same parts as FIG. 7A may be omitted or made briefly.

In FIG. 7B, the first and second nodes 610 and 620 act as the primary transmitter and receiver, respectively, as in FIG. 7A. Among the third and fourth nodes 630 and 640 as candidate secondary transmitter, the third node 630 is selected as the secondary transmitter.

The first node 610 transmits the RST signal 701 to the second node 620 and, if the RTS signal 701 is received, the second node 620 waits for the SIFS 710 and subsequently transmits the CTS signal 702 to the first node 610. The third and fourth nodes 630 and 640 may estimate channel state with the second node 620 based on the CTS signal 702 transmitted by the second node 620. If the channel state estimated in association with the second node 620 is bad, the third and fourth nodes 630 and 640 may determine to perform packet transmission. The detailed description thereof has been made above and thus is omitted herein. If the CTS signal 702 is received, the first node 610 may wait for the SIFS 710 and subsequently transmit the packet 731 to the second node 620.

If it is determined for the third node 630 to transmit the packet 741 to the first node 610, the third node 630 may transmit the packet 741 to the first node 610. Here, the packet 731 transmitted from the first node 610 to the second node 620 and the packet 741 transmitted from the third node 630 to the first node 610 may each carry their own packet length information. The packet length information may have a predetermined mapping rule or may be contained in the packet header.

Accordingly, the second node 620 may become aware of the presence of the packet 731 transmitted by the first node 610 during a period between timepoints t04 and t05, and the first node 610 may become aware of the presence of the packet 741 transmitted by the third node 630 during a period between timepoints t04 and t06. In this case, a node that can communicate with the first node 610 or the second node 620 but cannot receive the packet transmitted by the third node 630 may wait for the SIFS 710 starting from the timepoint when the packet transmission from the first node 610 is completed and subsequently transmit an RTS signal.

If a certain node that cannot receive signals from the third node 630 transmits an RTS signal in this way, a new reference synchronization timepoint is created in addition to the synchronization timepoint between the third node 630 and the first, node 610, in order to avoid such, a situation, it is configured, that the first node 610 transits a predetermined signal, e.g., busy tone, to indicate presence of transmission in progress during the period between timepoints t05 and t06 in which only the third node 610 is transmitting the packet.

By notifying other nodes that that the transmission of the packet 741 from the third node 630 to the first node 620 continues while the transmission of the packet 731 from the first node 610 to the second node 620 has been completed, it is possible to prevent other nodes from attempting transmission during the corresponding period, i.e., between t05 and t06, thereby maintaining the reference synchronization.

If the packet 741 transmitted by the third node 630 is received, the first node 610 may wait for the SIFS 710 and subsequently transmit the acknowledgement signal 725 to the third node 630. This makes it possible to match the transmission timings of the acknowledgement signal 725 and the acknowledgement signal 704 from the second node 620 to the first node 610. FIG. 7B exemplifies a case where the first node 610 transmits a positive acknowledgement (ACK) to the third node 630. Although not depicted, it may occur that both the third and fourth nodes 630 and 640 can transmit packets to the first node 610 in a source-based FD mode. In this case, a random back-off period may be configured to avoid data collision between the third and fourth nodes 630 and 640. In this case, if one node (e.g., third node 630 starts packet transmission, the other node (e.g., fourth node 640) gives up packet transmission. In contrast, if the fourth, node 640 starts packet transmission, the third node 630 gives up packet transmission. (In contrast, if the fourth node 640 starts packet transmission, the third node 630 waits for the back-off period to elapse and subsequently starts packet transmission.) In this way, two or more contending nodes can transmit packets without collision.

Figure 8:
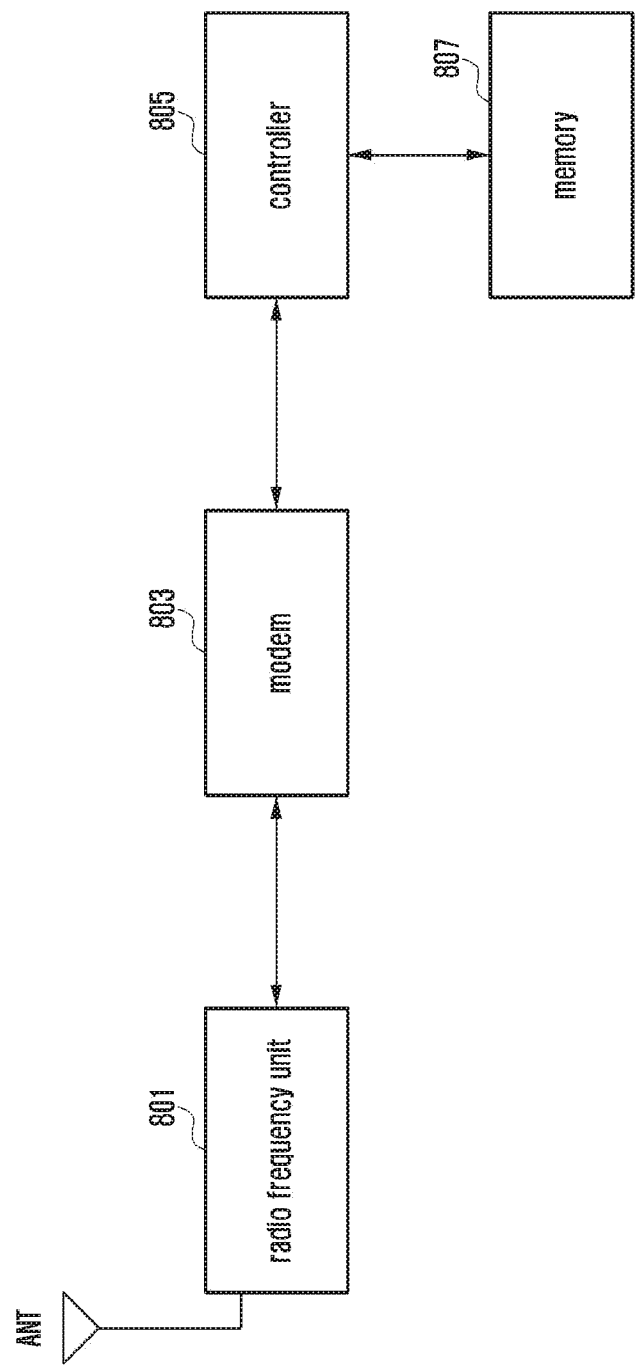
FIG. 8 is a block diagram illustrating a communication device supporting a full-duplex mode according to an embodiment of the present invention.

FIG. 8 is a block diagram illustrating a communication device supporting a full-duplex mode according to an embodiment of the present invention.

In reference to FIG. 8, an antenna (ANT) receives a signal, in a predetermined band and transfers the received signal to a radio frequency unit 801 or radiates a radio frequency signal output from the radio frequency unit 801.

The radio frequency unit 801 converts the radio frequency signal received by the antenna (ANT) to a baseband signal and outputs the baseband signal to a modern 803. The radio frequency unit 801 also up-converts a baseband signal from the modern 803 to a radio frequency signal and outputs the radio frequency signal to the antenna (ANT). The radio frequency unit 801 may be configured to support the full-duplex mode according to an embodiment of the present invention.

The modem 803 performs demodulation and decoding on the baseband signal and outputs the demodulated and decoded signal to a controller 805. The modem 803 may also work as a vocoder for processing voice data received and to be transmitted.

The controller 805 may control the communication device to operate as one of three nodes operating in the destination-based FD mode as described above. For example, if the communication device transmits or receives data in the destination-based three-node FD mode, the controller 805 controls the communication device to operate as the corresponding node. Also, if the communication device transmits or receives data in the source-based three-node FD mode, the controller 805 controls the communication device to operate as the corresponding node.

The memory 807 may include regions for storing data required for control operations of the controller 805 and data being generated during the control. The memory 807 may include a region for storing the above-described first and/or second threshold. The memory 807 may include other regions depending on necessity.

The radio frequency unit 801 may measure the aforementioned RTS or CTS signal strength, and the modem 803 converts the measurement result to a digital signal, which is transferred to the controller 805. The controller 805 may estimate channel states with other nodes based thereon. For example, if the communication device is a candidate secondary transmitter operating in the source-based three-node FD mode, the controller 805 may estimate a channel with a node operating as the primary receiver based on the strength of the CTS signal.

FIG. 8 depicts only the essential components of the present, invention. If necessary, the communication device may further include other components that are not shown in FIG. 8. For example, the communication device may further include a user interface (such as a key input device, a touchscreen, and a voice recognition device, a device for providing an interface for coupling with an external device, and a display device for displaying to the user operation status of the communication device and operations in progress. The communication device may also include other types of devices.

A description, is made of the procedure for controlling the above-configured communication device acting as a specific node with reference to the accompanying drawings.

Figure 9:
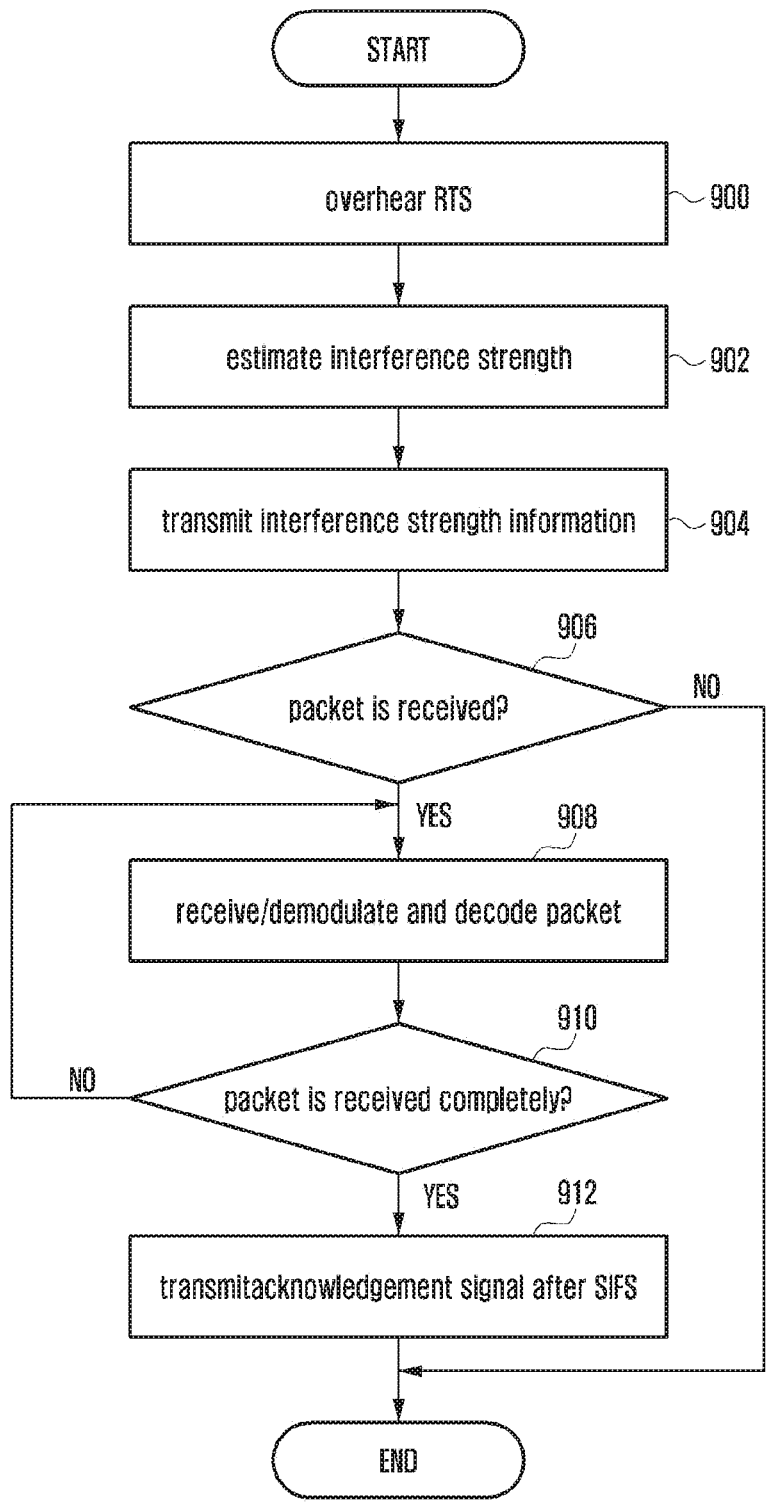
FIG. 9 is a flowchart illustrating an operation procedure of a communication device operating as a secondary receiver in the destination-based three-node FD system according to an embodiment of the present invention.

FIG. 9 is a flowchart illustrating an operation procedure of a communication device operating as a secondary receiver in the destination-based three-node FD system according to an embodiment of the present invention.

The controller SOS of the communication device operating as the secondary receiver may overhear an RTS signal by means of the radio frequency unit 801 and the modem 803 at step 900. In reference to FIG. 1, the RTS signal is a signal broadcast by the first node 110 to announce that it has data to transmit to the second node 120. The controller 805 may overhear the RTS signal at step 900 and estimate interference strength based on the overheard RTS signal at step 902. Here, if the RTS signal, is received, this means that it may be possible to estimate a channel with the first node 110. Accordingly, the controller 805 may estimate the channel between the communication device and the first node 110 and compute interference strength according to the estimated channel status. The communication device has to estimate interference amount from, the first node 110 and transmit the estimated interference amount to the second node 120 because it has to receive data from the second node 120 while the first node 110 transmits data to the second node 120.

Accordingly, the controller 805 controls the communication device to transmit the estimated interference strength to the second node 120 in a predetermined format at step 904. Here, the predetermined format may be one of the formats described with reference to FIGS. 3A to 3G. This means that the interference strength information is transmitted for a duration as part of the CTS signal transmission period from the second node 120 to the first node 110 as described with reference to FIGS. 2A and 2B.

Next, the controller 805 determines whether a packet is received from the second node 120 at step 906. The determination at step 906 may be made after waiting for a SIFS defined for Wi-Fi systems. If it is determined at step 906 that a packet is received, the procedure goes to step 908. Otherwise if it is determined at step 906 that no packet is received, the controller 805 may determine that the communication device is not selected as the secondary receiver and thus end the routine of FIG. 9.

At step 908, the controller 805 controls the radio frequency unit 801 and the modem 803 to receive the packet and perform demodulation and decoding on the received packet. After step 908, the controller 805 determines whether the packet is received completely at step 910. If it is determined at step 910 that the packet is received completely, the controller 805 waits for the SIFS period and subsequently transmits an acknowledgement signal at step 912. Otherwise, if the packet is not received completely, the controller 805 returns the procedure to step 905.

Figure 10:
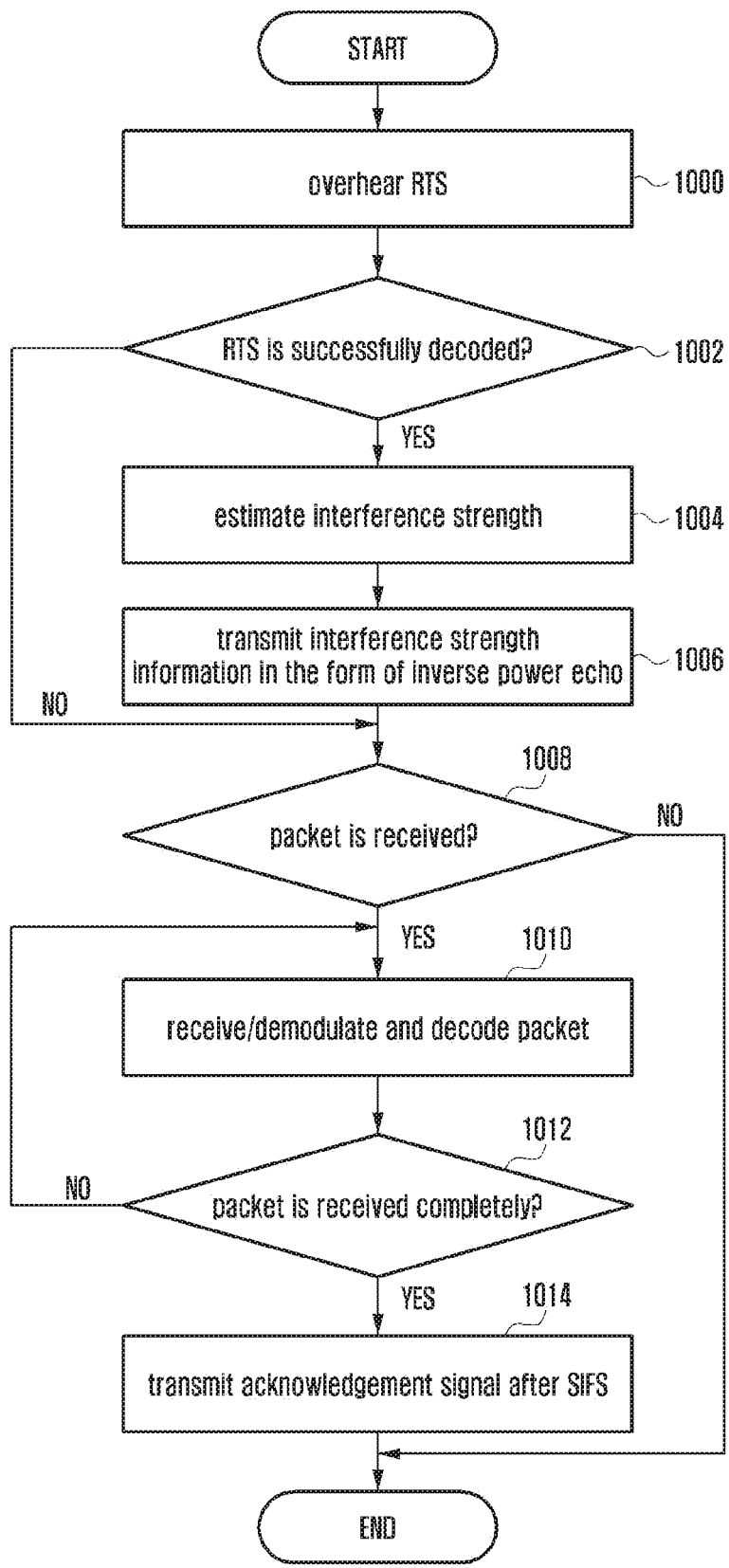
FIG. 10 is a flowchart illustrating an operation procedure of a communication device operating as a secondary receiver in the destination-based three-node FD system according to another embodiment of the present invention.

FIG. 10 is a flowchart illustrating an operation procedure of a communication device operating as a secondary receiver in the destination-based three-node FD system according to another embodiment of the present invention.

The controller 805 of the communication device operating as the secondary receiver may overhear an RTS signal by means of the radio frequency unit 801 and the modem 803 at step 1000. In reference to FIG. 1, the RTS signal is a signal broadcast by the first node 110 to announce that it has data to transmit to the second node 120. The controller 805 overhears the RTS signal at step 1000 mid determines at step 1002 whether the RTS signal is decoded successfully. If it is determined at step 1002 that the RTS signal is decoded successfully, the procedure goes to step 1004; otherwise if it is determined at step 1002 that the RTS signal is not decoded successfully, the procedure jumps to step 1008. If the procedure jumps to step 1008, this means that no interference strength information is transmitted.

At step 1004, the controller 805 may estimate interference strength based on the overheard RTS signal. Next, the controller 805 processes the estimated interference strength information to generate the interference strength information in the form of inverse power echo at step 1006 and controls the communication device to transmit the interference strength information to the second node in a predetermined format. Here, the predetermined format may be one of the formats described with reference to FIGS. 3A to 3C. This means that the interference strength information is transmitted for a duration as part of the CTS signal transmission period from the second node 120 to the first node 110 as described with reference to FIGS. 2A and 2B. Here, the inverse power echo means that the transmission to the second node is performed at a power level inversely proportional to the interference strength (interference amount) received from the first node. The second node may analogize the interference strength (interference amount) from the third or fourth node to the first node based on this value.

Next, the controller 805 determines at step 1008 whether a packet is received from the second node 120. Whether a packet is received may be determined in the same manner for both the cases where the procedure progresses from step 1002 to step 1008 and from step 1006 to step 1008. If the procedure progresses from step 1006 to step 1008, the controller 805 may control the communication device to wait for the SIFS defined for Wi-Fi systems and subsequently perform the operation of step 1008. Otherwise if the procedure jumps from step 1002 to step 1008, the controller 805 may control fee communication device to wait for the SIFS after overhearing the CTS signal and subsequently perform the operation of step 1008.

If it is determined at step 1008 that a packet is received, the procedure goes to step 1010. Otherwise if it is determined at step 1008 that no packet is received, the controller 805 may determine that it is not selected as the secondary receiver and thus end the routine of FIG. 10.

At step 1010 the controller 805 controls the radio frequency unit 801 and the modem 803 to receive the packet and perform demodulation and decoding on the received packet. In the course of step 1010, the controller 805 may determine at step 1012 whether the packet is received completely. If it is determined at step 1012 that the packet is received completely, the controller 805 may wait for the SIFS and subsequently transmit an acknowledgement signal at step 1014. Otherwise if it is determined at step 1012 that the packet is not received completely, the controller 805 returns the procedure to step 1010.

Figure 11:
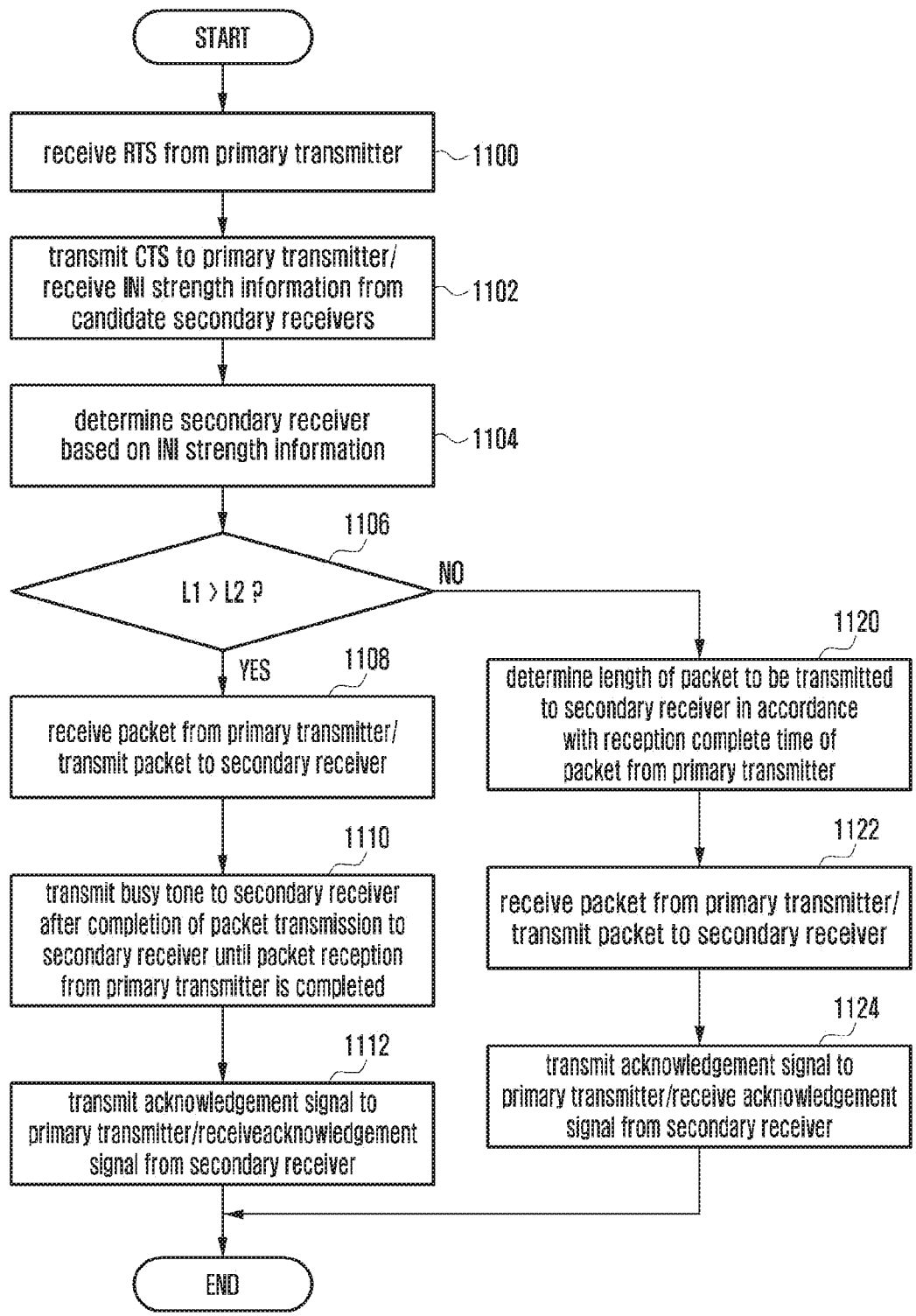
FIG. 11 is a flowchart illustrating an operation procedure of a communication device operating as a primary receiver and a secondary transmitter in the destination-based three-node FD according to an embodiment of the present invention.

FIG. 11 is a flowchart illustrating an operation procedure/ of a communication device operating as a primary receiver and a secondary transmitter in the destination-based three-node FD according to an embodiment of the present invention.

The controller 805 of the communication device operating as the primary receiver and the secondary transmitter may receive an RTS signal from the primary transmitter at step 1100. That the controller 805 controls the mode 803 and the radio frequency unit 801 to transmit a CTS signal to the primary transmitter at step 1102. At step 1102, the controller 805 may also control to receive INI strength information, from candidate secondary receivers using the whole or part of the resources designated for CTS signal transmission of the primary transmitter while receiving the CTS signal from the primary transmitter simultaneously. The INI strength information has been described above; thus, a detailed description thereof is omitted herein.

The controller 805 of the communication device operating as the primary receiver and the second transmitter may determine a secondary receiver at step 1104 based on the INI strength information, received from the candidate secondary receivers. Although the secondary receiver determination can be made based on various metrics (such as INI strength information, packet transmission sendee quality, and buffer status), the present invention is directed, to an exemplary case of determining the secondary receiver based, on only the INS strength information.

After determining the secondary receiver at step 1104, the controller 805 of the communication device operating as the primary receiver and the secondary transmitter determines at step 1106 whether the packet length (L1) of the packet received from the primary transmitter is longer than the packet length (L2) of the packet to be transmitted to the secondary receiver. If it is determined at step 1106 that the packet length (L1) of the packet received from the primary transmitter is longer than the packet length (L2) of the packet to be transmitted to the secondary receiver, the procedure goes to step 1108; otherwise if the packet, length (L1) of the packet, received from the primary transmitter is equal to or less than the packet length (L2) of the packet to be transmitted to the secondary receiver, the procedure goes to step 1120.

If the procedure progresses from step 1106 to step 1120, this is the case where the packet length (L1) of the packet received from the primary transmitter is equal to or less than the packet length (L2) of the packet, to be transmitted to the secondary receiver. At step 1120, the controller 805 may determine the packet length of the packet to be transmitted in accordance with the reception completion time of the packet from the primary transmitter. If the packet length (L1) of the packet received from the primary transmitter is equal to the packet length (L2) of the packet to be transmitted to the secondary receiver, it is possible to transmit the packet as it is. However, if the packet length (L2) of the packet to be transmitted to the secondary receiver is longer than the packet length (L1) of the packet received from the primary transmitter, the controller 805 determines to set the packet length (L2) of the packet to be transmitted to the secondary receiver to be equal to the packet length (L1) of the packet received from the primary transmitter.

Next, the controller 805 controls the radio frequency unit 801 and the mode 805 to receive a packet from the primary transmitter and transmit a packet to the secondary receiver at step 1122. In this way, one node can operate as the primary receiver and the secondary transmitter in the full-duplex mode. After completing the receipt of the packet from the primary transmitter, the controller 805 waits for the SIFS and subsequently transmits an acknowledgement signal at step 1124. At step 1124, the controller 805 may also receive an acknowledgement signal in response to the packet transmitted to the secondary receiver.

If the procedure progresses from step 1106 to step 1108, this is the case where the packet length (L1) of the packet received from the primary transmitter is greater than the packet length (L2) of the packet to be transmitted to the secondary receiver. At step 1108, the controller 805 receives a packet from the primary transmitter and transmits a packet to the secondary receiver simultaneously. However, since the packet length (L2) of the packet to be transmitted to the secondary receiver is less than the packet length (L1) of the packet received from the primary transmitter, the timepoint when the packet transmission to the secondary receiver is completed is earlier than the timepoint when the packet transmission of the primary transmission is completed. This situation has been described with reference to FIG. 2A.

Accordingly, the controller 805 transmits a busy tone to the secondary receiver during a period between the timepoint when the packet transmission to the secondary receiver ends and the timepoint when the packet reception from the primary transmitter ends. i.e. between t05 and t06 in FIG. 2A. In this way, it is possible to prevent a terminal from having a different synchronisation in a network.

If the packet transmitted by the primary transmitter is received completely, the controller 805 waits for the SIFS and subsequently transmits an acknowledgement signal at step 1112. At step 1112, the controller 805 may also receive an acknowledgement signal in response to the packet transmitted to the secondary receiver.

Figure 12:
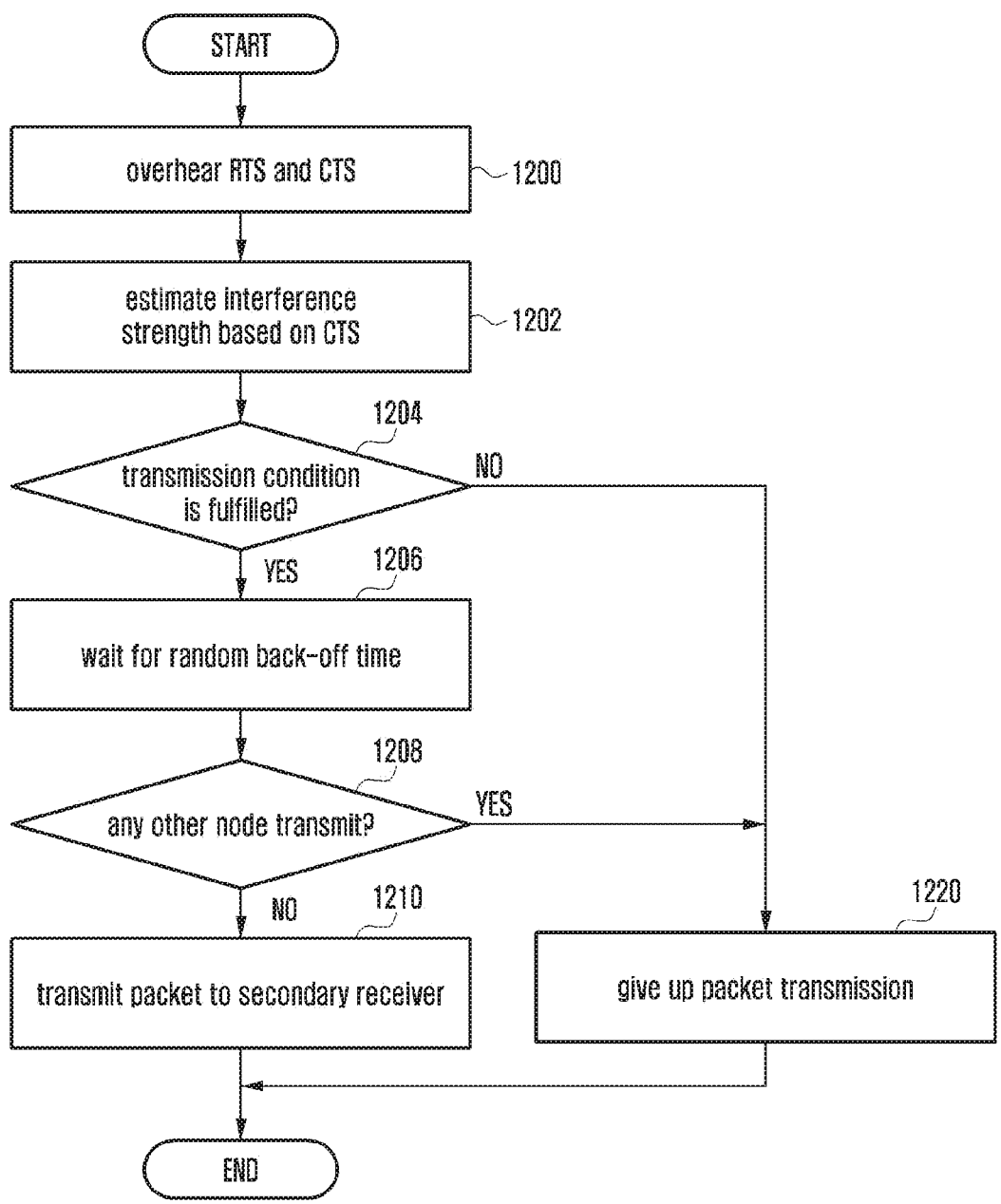
FIG. 12 is a flowchart illustrating an operation procedure of a communication device operating as a candidate secondary transmitter in the source-based three-node FD mode according to an embodiment of the present invention.

FIG. 12 is a flowchart illustrating an operation procedure of a communication device operating as a candidate secondary transmitter in the source-based three-node FD mode according to an embodiment of the present invention.

At step 1200, the controller 805 of the communication device operating as a candidate secondary transmitter may overhear an RTS transmitted from a primary transmitter to a primary receiver and a CTS signal transmitted from the primary receiver to the primary transmitter in response to the RTS signal. In reference to FIG. 6, the third node 630 or the fourth node 640 may be the candidate secondary transmitter. If the third node 630 is the candidate secondary transmitter, it may overhear the RTS signal transmitted from the first node 610 to the second node 620 and the CTS signal transmitted from the second node 620 to the first node 6I 0 in response to the RTS signal.

After overhearing the RTS and CTS signals, the controller 805 may estimate interference based on the CTS signal at step 1202. That is, the controller 805 estimates a channel between the second node 620 and the third node 630. After estimating the channel, the controller 805 determines at step 1204 whether the communication device, i.e. the secondary receiver, can transmit a packet to a node operating as the primary transmitter without interference or with little interference to the second node 620. This determination may be made to determine whether a transmission condition is fulfilled.

If the transmission condition is fulfilled at step 1204, the procedure goes to step 1206; otherwise if the transmission condition is not fulfilled, the procedure goes to step 1220 to give up packet transmission. If the transmission condition is fulfilled, this may be the case where the received signal strength on the channel between the candidate secondary transmitter and the primary receiver is equal to or less than a first threshold. If the transmission condition is fulfilled at step 1204, the controller 805 sets a random back-off time and waits for the random back-off time to expire at step 1206.

Next, the controller 805 of the candidate secondary transmitter may determine at step 1208 whether another node has started transmission. If it is determined that another node has started transmission during the back-off time, the controller 805 gives up transmission at step 1220. Otherwise if it is determined that no other node has started transmission, the controller 805 may control the radio frequency unit 801 and the modem 803 to transmit a packet to the secondary receiver at step 1210. In this way, it may be possible to perform, full-duplex transmission without collision of packets transmitted by two different nodes.

It should be noted that the operation of receiving an acknowledgement signal from the secondary receiver in response to the packet transmitted, at step 1210 is not depicted in FIG. 12.

Figure 13:
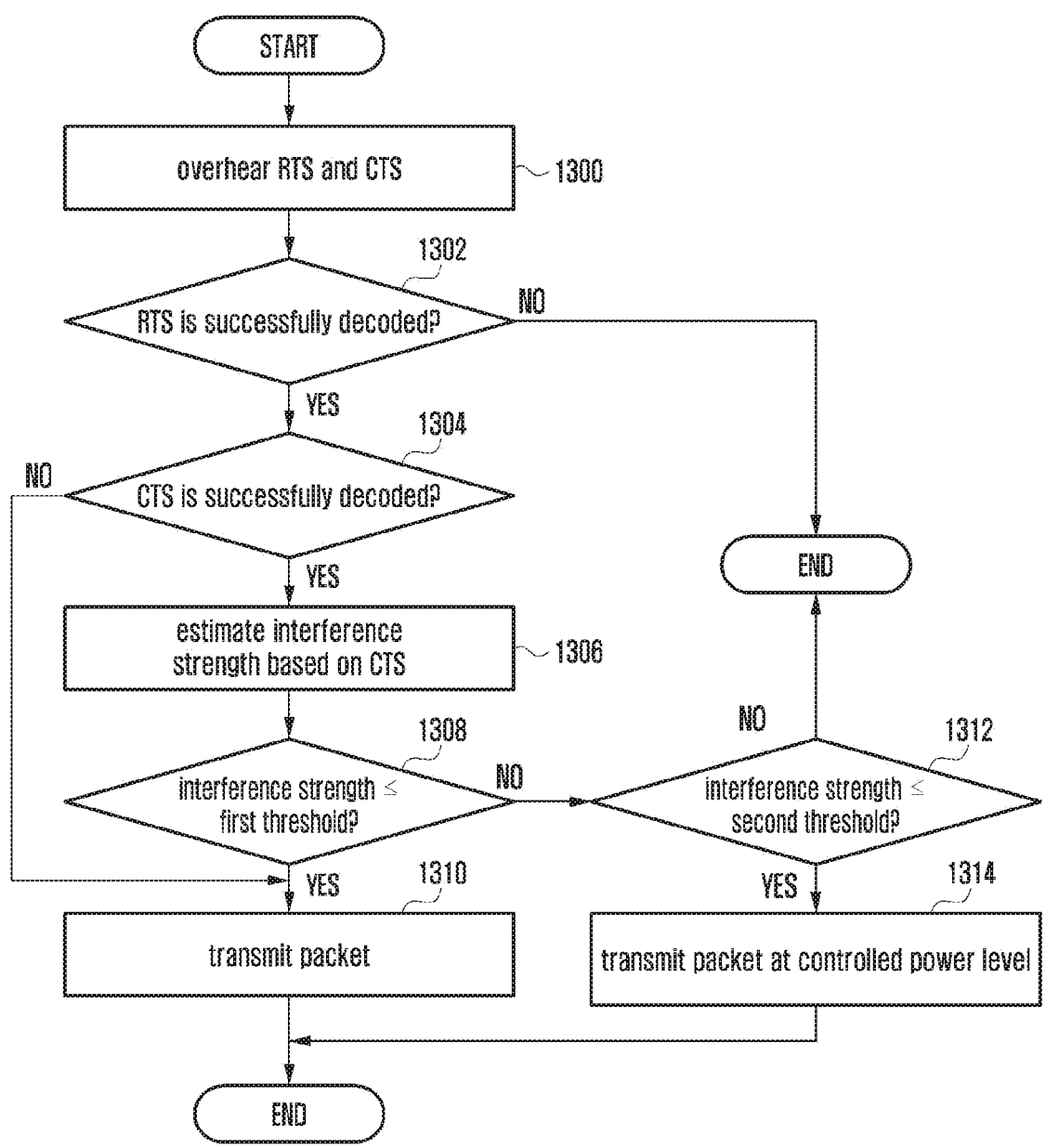
FIG. 13 is a flowchart illustrating an operation procedure of a communication device operating as a candidate secondary transmitter in the source-based three-node FD mode according to another embodiment of the present invention.

FIG. 13 is a flowchart illustrating an operation procedure of a communication device operating as a candidate secondary transmitter in the source based three node FD mode according to another embodiment of the present invention.

At step 1300, the controller 805 of the communication device operating as a candidate secondary transmitter may overhear an RTS transmitted from a primary transmitter to a primary receiver and a CTS signal transmitted from the primary receiver to the primary transmitter in response to the RTS signal. In reference to FIG. 6, the third node 630 or the fourth node 640 may be the candidate secondary transmitter. If the third node 630 is the candidate secondary transmitter, it may overhear the RTS signal transmitted from the first node 610 to the second node 620 and the CTS signal transmitted from the second node 620 to the first node 610 in response to the RTS signal.

After overhearing the RTS and CTS signals, the controller 805 may determine at step 1302 whether the modem 803 has succeeded in decoding the overheard RTS signal. If it has succeeded in decoding the RTS signal, the procedure goes to step 1304; otherwise if it has failed in decoding the RTS signal the controller 805 ends the routine of FIG. 13. At step 1304, the controller 805 may determine whether the modem 803 has succeed in decoding the overheard CIS signal. If it has succeeded in decoding the CTS signal, the procedure goes to step 1306; otherwise if it has failed in decoding the CTS signal the procedure goes to step 1310 at which the communication device operates as the secondary transmitter to transmit a packet to the secondary receiver. If the routine of FIG. 13 ends, this means that the communication device does not operate as the secondary transmitter.

At step 1306, the controller 805 may estimate interference strength based on the received CTS signal rather than the RTS signal. The reason why the interference strength is estimated based on the CTS signal rather than the RTS signal is to estimate a channel between the second and third nodes 620 and 630. After estimating the channel, the controller 805 determines at step 1308 whether the interference strength of the estimated channel is equal to or less than a first threshold. Here, the first threshold may be set to a maximum interference strength value allowed for packet transmission without restriction. If it is determined at step 1308 that the estimated interference strength is equal to or less than the first threshold, the controller 805 controls the communication device to operate as the secondary transmitter to transmit a packet to the secondary receiver at step 1310. In reference to FIG. 6, this means that the third node 640 transmits a packet to the first node 610.

Otherwise if it is determined at step 1308 that the estimated interference strength is greater than the first threshold, the procedure goes to step 1312. At step 1312, the controller 805 determines whether the estimated interference strength is equal to or less than a second threshold. As a result, the determination at step 1312 is made to determine whether the estimated interference strength is greater than the first threshold and equal to or less than the second threshold. If it is determined that the estimated interference strength is greater than the first threshold and equal to or less than the second threshold, the controller 805 controls, at step 1314, the communication device to operate as the secondary transmitter to transmit a packet to the secondary receiver at a controlled low power level.

Otherwise if it is determined at step 1312 that the estimated interference strength is greater than the second threshold, the controller 805 ends the routine of FIG. 13. If the routine of FIG. 13 ends, this means that the communication device does not operate as the secondary transmitter.

It should be noted that the operation of receiving an acknowledgement signal from the secondary receiver in response to the packet transmitted at step 1310 or 1314 is not depicted in FIG. 13.

Figure 14:
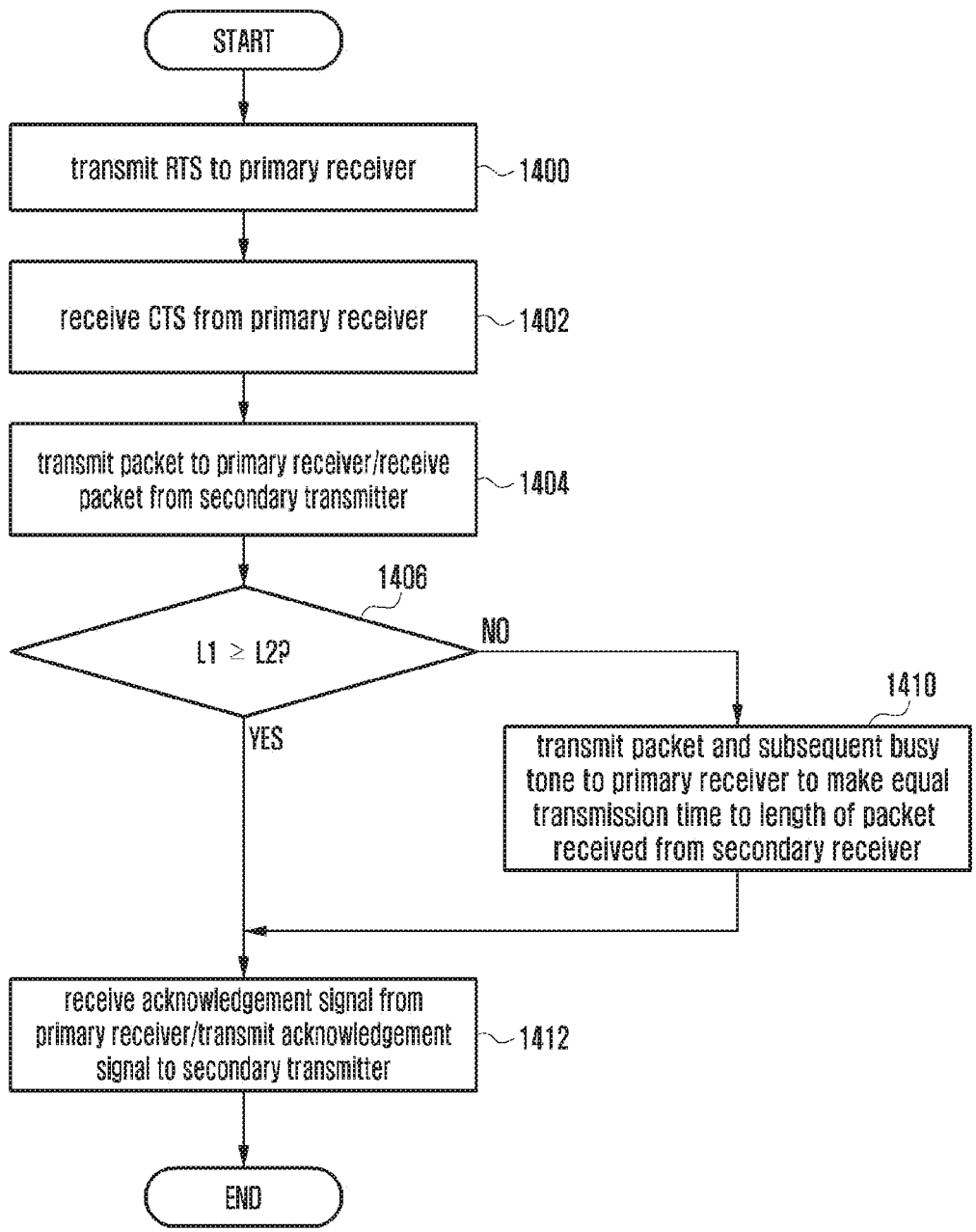
FIG. 14 is a flowchart illustrating an operation procedure of a communication device operating as a primary transmitter and a secondary receiver in the source-based three-node FD mode according to an embodiment of the present invention.

FIG. 14 is a flowchart illustrating an operation procedure of a communication device operating as a primary transmitter and a secondary receiver in the source-based three-node FD mode according to an embodiment of the present invention.

The controller 805 of the communication device operating as a primary transmitter and a secondary receiver controls the communication device to transmit an RTS signal to a primary receiver. This may be equivalent to a case where the first node 610 transmits an RTS signal to the second node 620 in FIG. 6. Next, the controller 805 controls the communication device to receive a CTS signal from the primary receiver at step 1402. This may be equivalent to a case where the second node 620 transmits a CTS signal to the first node 610 in FIG. 6. Upon receipt of the CTS signal, the controller 805 controls the communication device to wait for the SIFS and subsequently transmit at step 1404 a packet to the primary receiver and receive a packet from the secondary transmitter.

Here, the controller 805 is aware of the length (L1) of the packet transmitted, to the primary receiver because the communication device is operating as the primary transmitter, if a packet is received from the secondary transmitter, the modem 803 may demodulate and decode the header of the received packet to check for the length (L2) of the packet transmitted by the secondary transmitter.

The controller 805 compares the length (L1) of the packet transmitted by the primary transmitter and the length (L2) of the packet transmitted by the secondary transmitter to determine at step 1406 whether the packet length (L1) is equal to or greater than the packet length (L2). If it is determined at step 1406 that the length (L1) of the packet transmitted by the primary transmitter is equal to or greater than the length (L2) of the packet transmitted by the secondary transmitter, the procedure goes to step 1412; otherwise if it is determined at step 1406 that the length (L1) of the packet transmitted by the primary transmitter is less than the length (L2) of the packet transmitted by the secondary transmitter, the procedure goes to step 1410.

If it is determined that the packet length (L2) of the packet transmitted from the third node 630 to the first node 610 is less than the length (L1) of the packet transmitted from the first node 610 to the second node 620, the third node 630 transmits a busy tone during a period between timepoints t05 and t06 after completing the packet transmission to the first node 610. Accordingly, the controller 805 may control the busy tone reception completion time point to be identical with the timepoint when the packet transmission to the second node 620 ends. As a consequence, the controller 805 may control the communication device to transmit, an acknowledgement signal from the third node 630 as the secondary transmitter at the same time point when an acknowledgement signal is received from the primary receiver at step 1412.

A description is made of the case where the procedure goes to step 1410 because the length (L1) of the packet transmitted by the primary transmitter is less than the length (L2) of the packet transmitted by the secondary transmitter in reference to FIG. 7B. If the procedure goes to step 1410, this is the case where the length (L1) of the packet transmitted from the first node 610 to the second node 620 is less than the length (L2) of the packet transmitted from the third node 630 to the first node 610. If the packet transmission to the second node 620 is completed, the controller 805 controls the communication device to transmit at step 1410 a busy tone 732 during the period between timepoints t05 and t06 to make the transmission period to the second node 620 equal to the length of the packet transmitted from the third node 630 to the first node 610. After completing the packet transmission in such a way of matching the two packet lengths, the controller 805 may control the communication device to wait for the SIFS and subsequently transmit and receive an acknowledgement signal to the second node 620.

Although various embodiments of the present invention have been described using specific terms, the specification and drawings are to be regarded in an illustrative rather than a restrictive sense in order to help understand the present invention. Thus, the scope of the invention should not be construed as being limited to the exemplary embodiments, but it should be recognized as contemplating various changes and modifications within the spirit and scope of the invention.

The present invention proposes a technology applicable to wireless communication systems operating in a full-duplex mode.

The invention claimed is:

1. A packet reception method, the method comprising:
  overhearing, by a third node operating as a secondary receiving node in a network supporting destination-based full-duplex communication among three or more nodes, a Request-To-Send (RTS) signal transmitted from a first node operating as a primary transmitting node to a second node operating as a primary receiving node;
  generating, by the third node, an inter-node interference strength information relative to the first node based on received signal strength of the overheard RTS signal;
  reporting, by the third node, the inter-node interference strength information to the second node operating as a secondary transmitting node;
  demodulating and decoding, by the third node, when packet data are received from the second node, the packet data; and
  transmitting, by the third node, an acknowledgement signal to the second node in response to the packet data.

2. The method of claim 1, wherein the inter-node interference strength information is transmitted using at least part of resources allocated for transmitting a Clear-To-Send (CTS) signal from the second node to the first node.

3. The method of claim 2, wherein the inter-node interference strength information is transmitted through at least one subcarrier, at least one sub-band, or at least one time slot among the resources allocated for transmitting the CTS signal.

4. The method of claim 3, wherein the at least part of the resources for transmitting the inter-node interference strength information among the resource of the CTS signal is selected through a modulo operation with a number of resources to which an identifier of a communication device is allocable.

5. The method of claim 1, wherein the inter-node interference strength information is computed in a form of inverse echo power.

6. A packet transmission and reception method, the method comprising:
- transmitting, by a second node operating as a primary receiving node and a secondary transmitting node in a network supporting destination-based full-duplex communication among three or more nodes, when a Request-To-Send (RTS) signal is received from a first node operating as a primary transmitting node, a Clear-To-Send (CTS) signal after a predetermined time period elapses;
- receiving, by the second node, inter-node interference strength information from at least one third node operating as a candidate secondary receiving node using at least part of resources allocated for transmitting the CTS signal;
- determining, by the second node, a third node operating as a secondary receiving node, from among the at least one third nodes operating as candidate secondary receiving nodes, based on the inter-node interference strength information; and
- transmitting, by the second node, when a packet is received from the first node during a time resource, a packet to the third node using the time resource.

7. The method of claim 6, further comprising adjusting, by the second node, when a length of the packet to be transmitted to the third node is longer than a length of the packet received from the first node, the length of the packet to be transmitted to the third node to be equal to the length of the packet received from the first node.

8. The method of claim 6, further comprising transmitting, by the second node, when a length of the packet to be transmitted to the third node is shorter than a length of the packet received from the first node, a signal indicating communication in progress subsequent to completion of the packet transmission to the third node until the packet from the second node is received completely.

9. The method of claim 6, further comprising:
- transmitting, by the second node, when the packet transmission and reception are completed, an acknowledgement signal to the first node in response to the received packet; and
- receiving, by the second node, an acknowledgement signal from the third node in response to the transmitted packet.

10. The method of claim 6, wherein the inter-node interference strength information is received using at least part of resources allocated for transmitting the CTS signal from the second node to the first node.

11. The method of claim 6, wherein the inter-node interference strength information is received using at least one subcarrier, at least one sub-band, or at least one time slot of the resources allocated for transmitting the CTS signal.

12. The method of claim 11, wherein the at least part of the resources for transmitting the inter-node interference strength information among the resources allocated for transmitting the CTS signal is selected through a modulo operation with a number of resources to which an identifier of a communication device is allocable.

13. The method of claim 6, wherein the inter-node interference strength information is computed in a form of inverse echo power.

14. A packet transmission method, the method comprising:
- overhearing, by a third node operating as a candidate secondary transmitting node in a network supporting source-based full-duplex communication among three or more nodes, a Request-To-Send (RTS) signal transmitted from a first node operating as a primary transmitting node and a secondary receiving node to a second node operating as a primary receiving node, and a Clear-To-Send (CTS) signal transmitted from the second node to the first node;
- estimating, by the third node, inter-node interference signal strength of the second node based on the CTS signal; and
- transmitting, by the third node, when the estimated inter-node interference signal strength fulfils a transmission condition according to an estimation result of the inter-node interference signal strength, a packet to the first node after a random back-off time elapses.

15. The method of claim 14, further comprising:
- decoding, by the third node, the overheard RTS signal; and
- operating, by the third node, when the overheard CTS signal is not decoded, as a secondary transmitting node.

16. The method of claim 14, wherein the transmission condition is that the inter-node interference signal strength estimated based on the overheard CTS signal is equal to or less than a first threshold.

17. The method of claim 16, further comprising transmitting, by the third node, when the inter-node interference signal strength estimated based on the overheard CTS signal is greater or equal to than the first threshold and equal to or less than a second threshold, the packet at a reduced power level.

18. The method of claim 14, further comprising giving up, by the third node, when packet transmission from any other node to the first node after elapse of the random back-off time, packet transmission.

19. A packet transmission and reception method, the method comprising:
- transmitting, from a first node operating as a primary transmitting node and a secondary receiving node in a network supporting source-based full-duplex communication among three or more nodes, a Request-To-Send (RTS) signal to a second node operating as a primary receiving node;
- receiving, by the first node, a Clear-To-Send (CTS) signal from the second node in response to the RTS signal;
- transmitting, from the first node, a packet to the second node using predetermined resources;
- receiving, by the first node, a packet from a third node operating as a secondary transmitting node using the predetermined resources;
- receiving, by the first node, when the packet is completely transmitted to the second node, an acknowledgement signal from the second node; and
- transmitting, by the first node, an acknowledgement signal in response to the packet received from the third node.

20. The method of claim 19, further comprising transmitting, by the first node, when a length of the packet received from the third node is longer than a length of the packet transmitted to the second node, a signal indicating communication in progress subsequent to completion of packet transmission to the second node until the packet from the third node is received completely.

* * * * *